(12) United States Patent
Nishihara

(10) Patent No.: US 10,509,133 B2
(45) Date of Patent: Dec. 17, 2019

(54) RADIATION COUNTING DEVICE AND METHOD OF CONTROLLING RADIATION COUNTING DEVICE

(71) Applicant: SONY SEMICONDUCTOR SOLUTIONS CORPORATION, Kanagawa (JP)

(72) Inventor: Toshiyuki Nishihara, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 201 days.

(21) Appl. No.: 15/528,678

(22) PCT Filed: Sep. 15, 2015

(86) PCT No.: PCT/JP2015/076137
§ 371 (c)(1),
(2) Date: May 22, 2017

(87) PCT Pub. No.: WO2016/088426
PCT Pub. Date: Jun. 9, 2016

(65) Prior Publication Data
US 2017/0276807 A1    Sep. 28, 2017

(30) Foreign Application Priority Data

Dec. 1, 2014    (JP) ................. 2014-242784
Jun. 1, 2015    (JP) ................. 2015-111383

(51) Int. Cl.
*H04N 5/378*    (2011.01)
*H04N 5/3745*    (2011.01)
(Continued)

(52) U.S. Cl.
CPC .......... *G01T 1/2018* (2013.01); *G01T 1/2985* (2013.01); *H04N 5/32* (2013.01); *H04N 5/378* (2013.01); *H04N 5/3745* (2013.01)

(58) Field of Classification Search
None
See application file for complete search history.

(56) References Cited

U.S. PATENT DOCUMENTS 8,310,580 B2 *   11/2012    Suzuki ................. H04N 5/3575
348/308

FOREIGN PATENT DOCUMENTS

| JP | 2004-108796 | 4/2004 |
| JP | 2011-097581 A | 5/2011 |
| WO | WO 2014/050343 A1 | 4/2014 |

OTHER PUBLICATIONS

International Search Report prepared by the Japan Patent Office dated Sep. 15, 2015, for International Application No. PCT/JP2015/076137.

* cited by examiner

*Primary Examiner* — David P Porta
*Assistant Examiner* — Carolyn Fin
(74) *Attorney, Agent, or Firm* — Sheridan Ross P.C.

(57) ABSTRACT

A radiation counting device is provided that includes a scintillator, a pixel circuit, and an analog-to-digital conversion circuit. In the radiation counting device, the scintillator generates a photon when radiation is incident. In the radiation counting device, the pixel circuit converts the photon into charge, stores the charge over a predetermined period, and generates an analog voltage in accordance with the amount of stored charge. In the radiation counting device, the analog-to-digital conversion circuit converts the analog voltage into a digital signal in a predetermined quantization unit less than the analog voltage generated from the one photon.

10 Claims, 21 Drawing Sheets

(51) Int. Cl.
  *G01T 1/20* (2006.01)
  *H04N 5/32* (2006.01)
  *G01T 1/29* (2006.01)

a b a b a b a b

RADIATION COUNTING DEVICE AND METHOD OF CONTROLLING RADIATION COUNTING DEVICE

CROSS REFERENCE TO RELATED APPLICATIONS

This application is a national stage application under 35 U.S.C. 371 and claims the benefit of PCT Application No. PCT/JP2015/076137 having an international filing date of 15 Sep. 2015, which designated the United States, which PCT application claimed the benefit of Japanese Patent Application No. 2014-242784 filed 1 Dec. 2014, and Japanese Patent Application No. 2015-111383 filed 1 Jun. 2015, the disclosures of which are incorporated herein by reference in their entirety.

TECHNICAL FIELD

The present technology relates to a radiation counting device and a method of controlling the radiation counting device. Particularly, the present technology relates to a radiation counting device performing analog and digital conversion and a method of controlling the radiation counting device.

BACKGROUND ART

Radiation counting (photon counting) performed to count a radiation dose incident on a detector while performing individual energy separation in an incident photon unit is currently applied in various fields such as dosimeters and gamma cameras. A representative example is a broad dosimeter typified by a survey meter. As a detector, a scintillator and a photomultiplier tube are normally used. The energy and number of radiation beams incident on the detector are counted. When one or more photos of radiation are incident on a scintillator, the scintillator emits light and a pulse of the visible light with a light amount proportional to energy of radiation is released. The pulse of the emitted light arrives and is detected by a photomultiplier tube whenever a photon of the radiation is incident. Here, the scintillator is covered with a partition wall in a state in which only a surface oriented to the photomultiplier tube is open. The partition wall blocks infiltration of the visible light from the outside and preferably reflects light generated from the inside to cause all of the light to be incident on the photomultiplier tube.

In the dosimeter, the photomultiplier tube generates an analog electric pulse by converting a pulse of emitted light into electrons and amplifying the electrons. A pulse height of the analog electric pulse is proportional to a light amount of the emitted light of the scintillator, that is, energy of radiation. An independent pulse is output whenever one photon of radiation is incident. Therefore, the dosimeter can obtain the number of photons of incident radiation by counting the number of pulses.

In the above-described dosimeter, a detection circuit includes, for example, an amplifier, an integrator, and analog-to-digital (AD) converter. The amplifier further amplifies an output analog signal, the integrator integrates pulses, and the AD converter performs AD conversion. Thus, the dosimeter can derive energy of each photon of incident radiation as a digital value. A digital processing circuit in the dosimeter accumulates an output result of the detection circuit during a predetermined period and derives an energy spectrum of the photons of the radiation. The energy spectrum indicates a presence ratio of the photons of the radiation captured by the dosimeter for each energy. Thus, the dosimeter can specify a radiation source. A transmission probability or an acquisition probability of the radiation further captured by the scintillator differs for each energy. Accordingly, when the number of photons acquired for each energy is returned as the acquisition probability by the digital processing circuit, the number of incident photons can be obtained. In this way, a dose is corrected in accordance with a G function or Dyson boson mapping (DBM) (for example, see Patent Literature 1).

Using a scintillator and a photomultiplier tube in the above-described radiation photon counting is mainstream. However, the photomultiplier tube is expensive and is not appropriate for miniaturization and light reduction. In addition, there is also problem of the photomultiplier tube being easily affected by magnetic fields. Instead of the photomultiplier tube, use of an avalanche photodiode (ADP) or an array of silicon photomultipliers (SiPM) has also been proposed. However, for the former, an output signal is considerably weak, an output fluctuation caused by temperature is severe, and an influence of an external environment is great. In addition, for the latter, there is a problem of a dark current being large since a high electric field is necessary and floor noise being large due to an afterpulse, crosstalk, or the like. Further, since an APD and SiPM use high voltages, a separate power supply circuit is necessary and an output is also an analog signal. Therefore, it is necessary to externally provide a separate amplifier, integrated circuit, or AD conversion circuit, and thus there is problem of an influence of external noise during signal transfer.

On the other hand, Patent Literature 2 proposes a new image sensor using photon counting in which a dynamic range is raised using time division and surface division by a plurality of pixels together while following a circuit configuration of a complementary MOS (CMOS) imager. Such a device can also be used as a photon counting device in which an entire pixel array in a chip is configured as one light reception surface. In the above-described image sensor, an AD conversion circuit is mounted as an on-chip, a pixel signal is received, and whether a photon is incident on each pixel is subjected to binary determination by providing a threshold.

CITATION LIST

Patent Literature

Patent Literature 1: JP 2004-108796A
Patent Literature 2: JP 2011-97581A

DISCLOSURE OF INVENTION

Technical Problem

In the above-described configuration, the AD conversion circuit performs AD conversion using an output voltage from a pixel at the time of incidence of one photon as a quantization unit. However, since noise of a half or more of the quantization unit can occur in a transistor or the like in a pixel, an error of a digital signal increases. Thus, it is difficult to accurately perform radiation counting.

The present technology is devised in view of the foregoing circumstances and an object of the present technology is to accurately perform radiation counting.

Solution to Problem

The present technology has been made to solve the above problem. According to a first aspect of the present disclosure, there is provided a radiation counting device including: a scintillator configured to generate a photon when a radiation is incident; a pixel circuit configured to convert the photon into charge, store the charge over a predetermined period, and generate an analog voltage in accordance with amount of the stored charge; and an analog-to-digital conversion circuit configured to convert the analog voltage into a digital signal in a predetermined quantization unit less than the analog voltage generated from the one photon. Thus, it is possible to obtain an operation effect in which the analog voltage is converted into the digital signal in the quantization unit less than the analog voltage generated from one photon.

In addition, according to the first aspect, the analog-to-digital conversion circuit may convert the analog voltage into a digital signal in the quantization unit not exceeding half of the analog voltage generated from the one photon. Thus, it is possible to obtain an operation effect in which the analog voltage is converted into the digital signal in the quantization unit not exceeding half of the analog voltage generated from one photon.

In addition, according to the first aspect, the analog-to-digital conversion circuit may convert the input voltage into a digital signal in the quantization unit not exceeding ¼ of the analog voltage generated from the one photon. Thus, it is possible to obtain an operation effect in which the analog voltage is converted into the digital signal in the quantization unit not exceeding ¼ of the analog voltage generated from one photon.

In addition, according to the first aspect, the pixel circuit may include a photoelectric conversion unit configured to convert the photon into charge, a charge storage unit configured to store the charge and generate a voltage in accordance with—amount of the charge as the analog voltage, and an amplification element configured to amplify the analog voltage and output the amplified analog voltage to the analog-to-digital conversion circuit. Thus, it is possible to obtain an operation effect in which the analog voltage is amplified and output.

In addition, according to the first aspect, the radiation counting device may include a plurality of the scintillators, and a predetermined number of the pixel circuit may be installed for each of the scintillators. Thus, it is possible to obtain an operation effect in which photons are generated by the plurality of scintillators.

In addition, according to the first aspect, the pixel circuit may be installed in a first substrate, and the detection circuit may be installed in a second substrate stacked on the first substrate. Thus, it is possible to obtain an operation effect in which the analog voltage is converted into the digital signal by the detection circuit on the substrate stacked on the substrate in which the pixel circuit is installed.

In addition, according to the first aspect, the pixel circuit may include a photoelectric conversion unit configured to convert the photon into charge, an intermediate node configured to retain the charge, a first transmission unit configured to transmit the charge from the photoelectric conversion unit to the intermediate node, a charge storage unit configured to store the charge and generate a voltage in accordance with amount of the charge as the analog voltage, and a second transmission unit configured to transmit the retained charge from the intermediate node to the charge storage unit. Thus, it is possible to obtain an operation effect in which the charge is transmitted from the photoelectric conversion unit to the intermediate node and the charge is transmitted from the intermediate node to the charge storage unit.

In addition, according to the first aspect, the radiation counting device may further include a data processing unit configured to process the digital signal and count the number of incident radiations. Thus, it is possible to obtain an operation effect in which the number of incident radiation beams is counted.

In addition, according to the first aspect, a predetermined number of the pixel circuits may be disposed in a 2-dimensional lattice form in a substrate, and the data processing unit may calculate a total sum of values of a constant number of the digital signals as a value of light emission amount of the scintillator. Thus, it is possible to obtain an operation effect in which the total sum of the values of the digital signals from the pixel circuits disposed in the 2-dimensional lattice form is calculated.

Advantageous Effects of Invention

According to the present technology, it is possible to obtain the advantageous effect of accurately performing radiation counting. Also, the advantageous effects described here are not necessarily limited and any advantageous effect described in the present disclosure may be obtained.

MODE(S) FOR CARRYING OUT THE INVENTION

Hereinafter, modes for carrying out the present technology (hereinafter referred to as embodiments) will be described. The description will be made in the following order.

1. First embodiment (example in which AD conversion is performed in quantization unit less than one-photon signal)
2. Second embodiment (example in which AD conversion is performed in quantization unit less than one-photon signal by configuring multiple heads)
3. Third embodiment (example in which AD conversion is performed in quantization unit less than one-photon signal in stacked light detectors)
4. Fourth embodiment (example in which AD conversion is performed in quantization unit less than one-photon signal by simultaneously exposing all rows)
5. Fifth embodiment (first example in which plurality of pixel array units are disposed in one chip in matrix form and are simultaneously operated)
6. Sixth embodiment (second example in which plurality of pixel array units are disposed in one chip in matrix form and are simultaneously operated)

1. First Embodiment

[Configuration Example of Radiation Counting Device]

Figure 1:
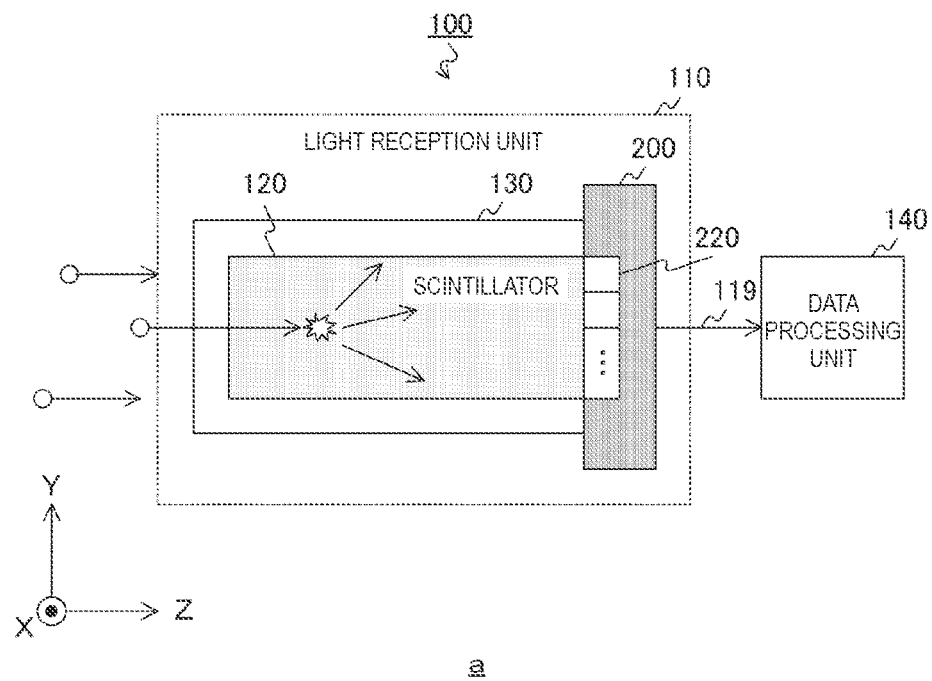
FIG. 1 is a diagram illustrating an overall configuration example of a radiation counting device according to a first embodiment.
Figure 1:
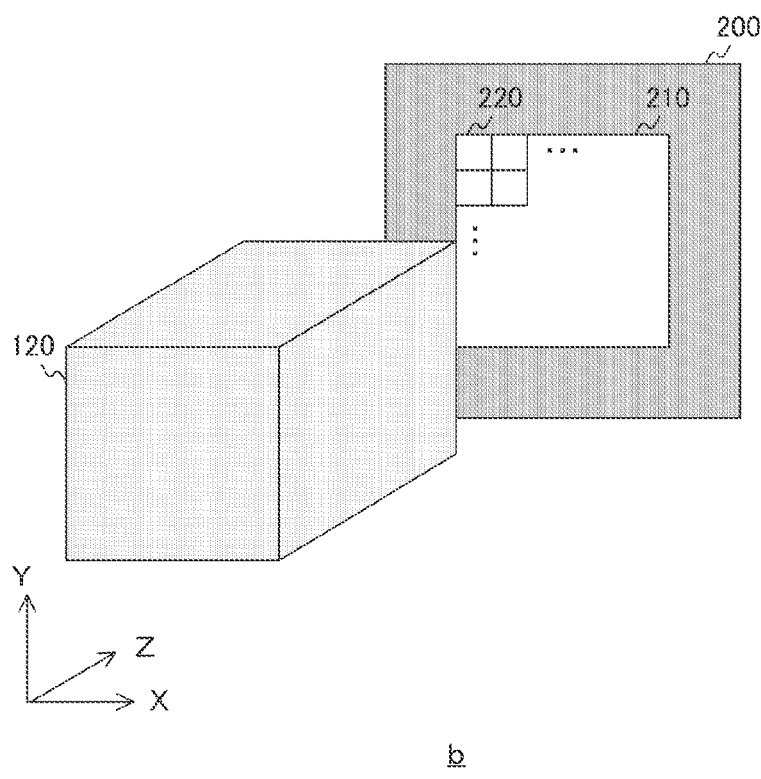

FIG. 1 is a diagram illustrating an overall configuration example of a radiation counting device 100 according to a first embodiment. FIG. 1a is a sectional view illustrating the radiation counting device 100. FIG. 1b is a perspective view illustrating the radiation counting device 100. The radiation counting device 100 includes a light reception unit 110 and a data processing unit 140. The light reception unit 110 includes a scintillator 120, a partition wall 130, and a light detector 200.

The scintillator 120 generates photons when radiation is incident. The scintillator 120 contains, for example, sodium iodide (NaI) and is processed in a columnar shape with a square of 4 millimeters (mm).

The partition wall 130 covers the scintillator 120 to block the visible light. Here, in the partition wall 130, only a surface facing the light detector 200 is open. The partition wall 130 is preferably configured of a reflective substance (for example, aluminum) reflecting light. Thus, most of the photons generated by the scintillator 120 are incident on the light detector 200.

The light detector 200 detects light and generates a digital signal. The light detector 200 has a light reception surface facing the scintillator 120 and a plurality of (for example, 520×520) pixel circuits 220 are installed in a 2-dimensional lattice form on the light reception surface. The details of the pixel circuits 220 will be described below. The light detector 200 supplies the generated digital signal to the data processing unit 140 via a signal line 119.

The data processing unit 140 processes the digital signal and performs radiation counting. The data processing unit 140 performs energy determination of one photon generated from the radiation.

The scintillator 120 and the light detector 200 are preferably adhered by an optical adhesive that has an appropriate refractive index or a light guide formed of fiberglass may be inserted between the scintillator 120 and the light detector 200.

[Configuration Example of Light Detector]

Figure 2:
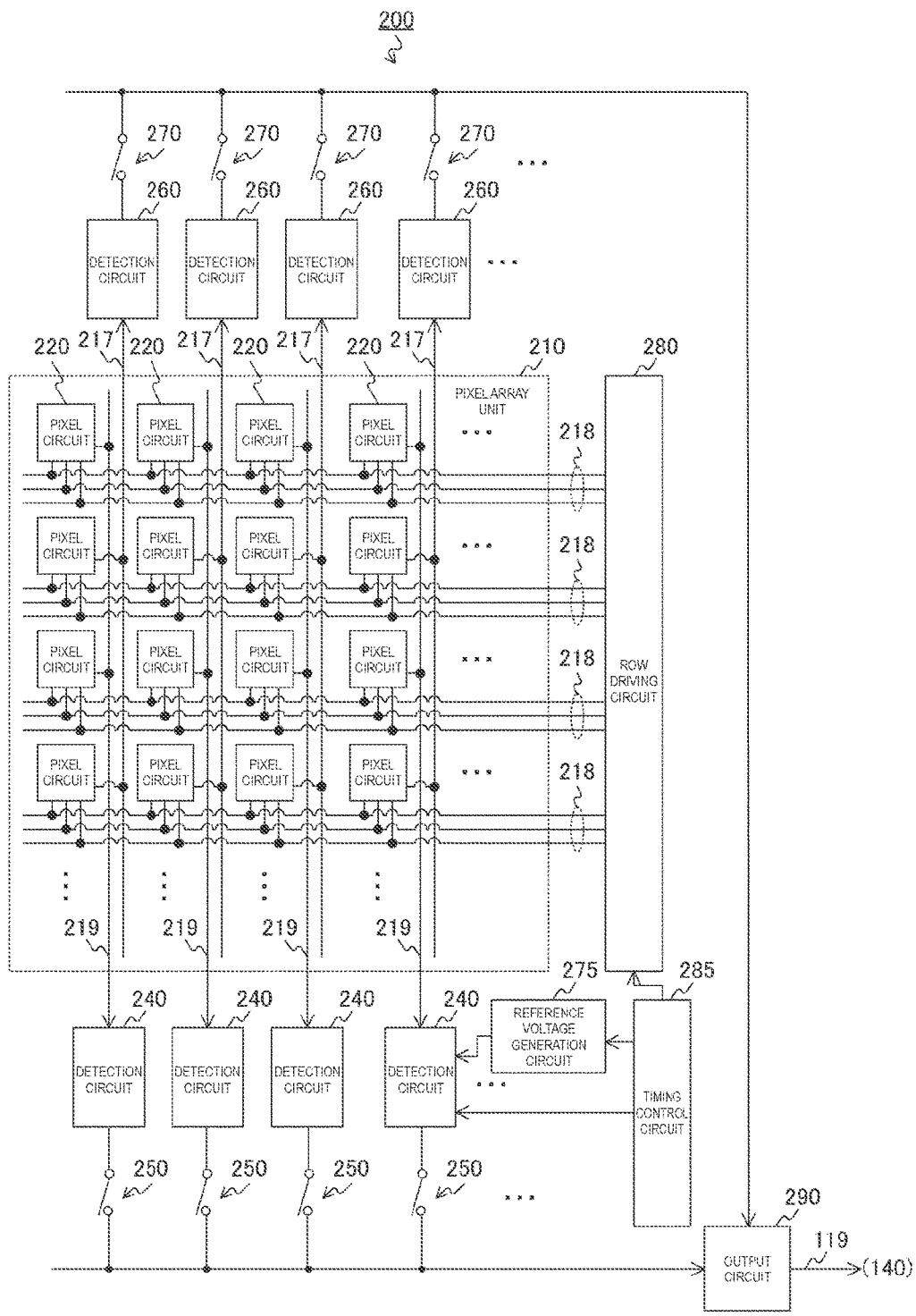
FIG. 2 is a block diagram illustrating a configuration example of a light detector according to the first embodiment.

FIG. 2 is a block diagram illustrating a configuration example of the light detector 200 according to the first embodiment. The light detector 200 includes a pixel array unit 210, detection circuits 240 and 260, switches 250 and 270, a reference voltage generation circuit 275, a row driving circuit 280, a timing control circuit 285, and an output circuit 290. These circuits are installed in one chip.

In the pixel array unit 210, a plurality of pixel circuits 220 are installed in a 2-dimensional lattice form. Hereinafter, the plurality of pixel circuits 220 arranged in a predetermined direction are referred to as a "row" and the plurality of pixel circuits 220 arranged in a direction perpendicular to the row are referred to as a "column."

The detection circuit 240, the switch 250, the detection circuit 260, and the switch 270 are installed at each column. The pixel circuits 220 in odd rows are connected to the detection circuits 240 via vertical signal lines 219 and the pixel circuits 220 in even rows are connected to the detection circuits 260 via vertical signal lines 217. Each of the pixel circuits 220 is connected to the row driving circuit 280 via a control line 218.

The row driving circuit 280 controls each of the pixel circuits 220 under the control of the timing control circuit 285. The row driving circuit 280 selects and exposes one pair of rows adjacent to each other in the column direction and causes the pixel circuits 220 in these rows to generate analog electric signals. The electric signals are read by the detection circuits 240 and 260 to be converted into digital signals. When the reading is completed, the row driving circuit 280 selects one subsequent pair of rows and performs the same control. When the reading of all the rows is completed, image data equivalent to one frame is output. When the 520×520 pixel circuits 220 are installed and 16 microseconds (μs) is necessary in each process for one pair of rows, 260 processes are necessary, and thus about 4.2 milliseconds (ms) is necessary to output one frame.

The detection circuits 240 convert electric signals from the pixel circuits 220 in the odd rows into digital signals under the control of the timing control circuit 285. The detection circuits 240 supply the converted digital signals to the switches 250. On the other hand, the detection circuits 260 convert electric signals from the pixel circuits 220 in the even rows into digital signals and detect light under the control of the timing control circuit 285. The detection circuits 260 supply the converted digital signals to the switches 270.

The switches 250 open and close paths between the corresponding detection circuits 240 and the output circuit 290. The switch 250 in each column supplies the digital signals in order to the output circuit 290 under the control of a column driving circuit (not illustrated) that selects columns in order. The switches 270 open and close paths between the corresponding detection circuits 260 and the output circuit 290. Like the switches 250, the switch 270 in each column also supplies the digital signals in order to the output circuit 290 under the control of a column driving circuit. The output circuit 290 outputs the digital signals to an image processing device or the like.

The timing control circuit 285 controls operation timings of the row driving circuit 280, the reference voltage generation circuit 275, the detection circuits 240, and the detection circuits 260. For example, the timing control circuit 285 generates a timing control signal indicating a scanning timing of a row and supplies the timing control signal to the row driving circuit 280. In addition, the timing control circuit 285 generates a digital-to-analog (DAC) control signal for controlling a reference voltage supply operation and supplies the DAC control signal to the reference voltage generation circuit 275. In addition, the timing control circuit 285 supplies detection control signals for controlling operations of the detection circuits 240 and 260 to the detection circuit 240 and 260. The details of the DAC control signal and the detection control signal will be described below.

The reference voltage generation circuit 275 generates a reference voltage $V_{ref}$ in accordance with the DAC control signal and supplies the reference voltage $V_{ref}$ to each of the detection circuits 240 and 260.

Figure 3:
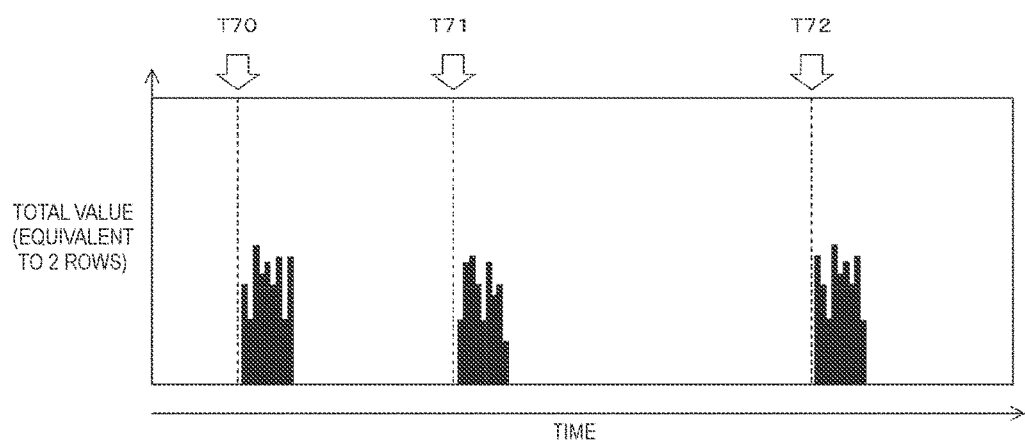
FIG. 3 is a diagram illustrating an example of a radiation counting result according to the first embodiment.

FIG. 3 is a diagram illustrating an example of a radiation counting result according to the first embodiment. The vertical axis of the drawing represents an output total value from the pixel circuits 220 in one pair of rows and the horizontal axis represents time. The output total value is calculated by the data processing unit 140. In the light detection 200, as described above, reading in units of two rows is repeated cyclically at the same interval. Since scintillation light is received almost uniformly by the pixel circuits 220 at a moment of light emission, signals start to be output from unit reading immediately after light emission. The signals are continuously output until the signals equivalent to one frame are read at one cycle from the output of the signals. Thereafter, a dark output is performed until the scintillator emits light again. A plot exemplified in the drawing is formed in an output shape resembling a pulse with a time width equivalent to one frame and a total sum of output values for each pulse is equivalent to a light emission amount of the scintillator.

[Configuration Example of Pixel Circuit]

Figure 4:
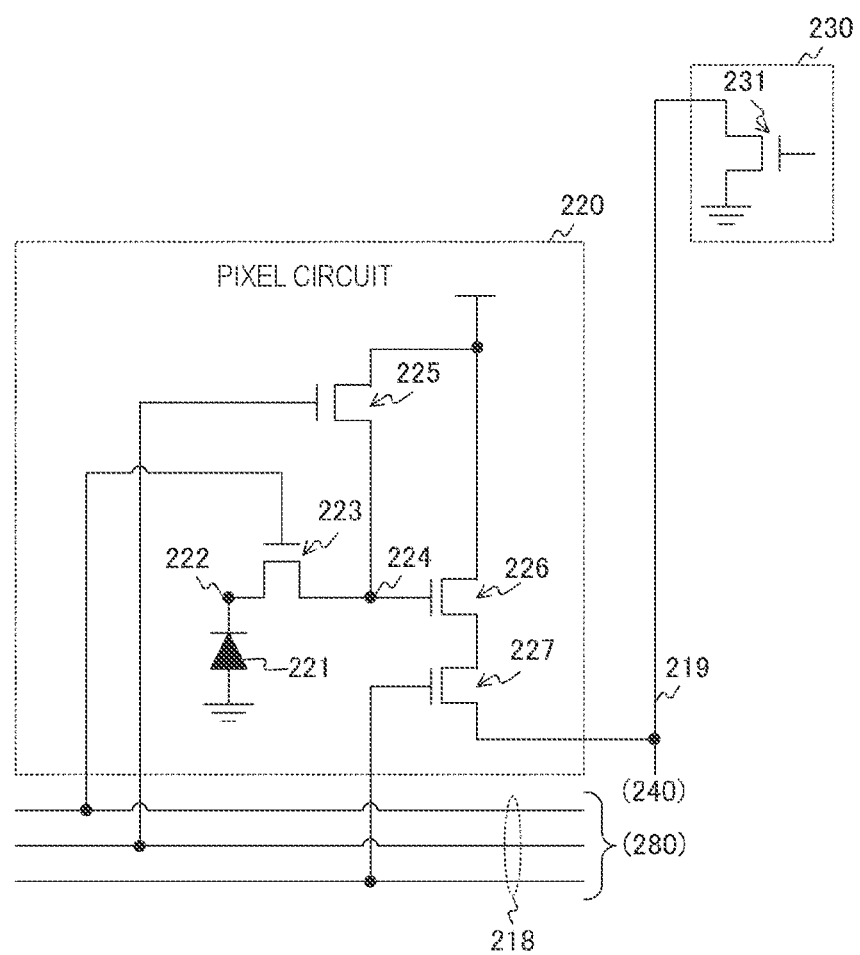
FIG. 4 is a circuit diagram illustrating a configuration example of a pixel circuit according to the first embodiment.

FIG. 4 is a circuit diagram illustrating a configuration example of the pixel circuit 220 according to the first embodiment. The pixel circuit 220 includes a photodiode 221, a storage node 222, a transmission transistor 223, a detection node 224, a reset transistor 225, an amplification transistor 226, and a select transistor 227. For example, n metal-oxide semiconductor (MOS) transistors are used as the transmission transistor 223, the reset transistor 225, the amplification transistor 226, and the select transistor 227.

The photodiode 221 converts photons into charge. The photodiode 221 is connected to the transmission transistor 223 via the storage node 222. The photodiode 221 generates a pair of an electron and a hole from a photon incident on a silicon substrate of the pixel circuit 220 and, out of the electron and the hole, stores the electron in the storage node 222. Also, the photodiode 221 is an example of a photoelectric conversion unit described in the claims. The photodiode 221 is an embedded photodiode fully depleted at the time of discharging of charge by resetting.

The transmission transistor 223 transmits the charge from the storage node 222 to the detection node 224 under the control of the row driving circuit 280.

The detection node 224 stores the charge from the transmission transistor 223 and generates an analog voltage in accordance with the amount of stored charge. The voltage is applied to a gate of the amplification transistor 226.

The reset transistor 225 extracts the charge stored in the storage node 222 or the detection node 224 to a power source for initialization. In the reset transistor 225, a gate is connected to the row driving circuit 280, a drain of the reset transistor 225 is connected to the power supply, and a source is connected to the detection node 224.

For example, the row driving circuit 280 extracts the electron stored in the storage node 222 to the power supply to initialize the pixel to a dark state before the storage, that is, a state in which light is not incident, by controlling the reset transistor 225 and the transmission transistor 223 such that the reset transistor 225 and the transmission transistor 223 are simultaneously turned on. In addition, the row driving circuit 280 extracts the charge stored in the detection node 224 to the power supply to initialize the amount of charge by controlling only the transmission transistor 223 such that the transmission transistor 223 is turned on.

The amplification transistor 226 amplifies a voltage of the gate. In the amplification transistor 226, a gate is connected to the detection node 224, a drain is connected to the power supply, and a source is connected to the select transistor 227. The amplification transistor 226 and a constant current circuit 230 form a source follower and a voltage of the detection node 224 is output with a gain less than 1 to the vertical signal line 219. An electric signal with the voltage is acquired by the detection circuit 240.

The select transistor 227 outputs the electric signal under the control of the row driving circuit 280. In the select transistor 227, a gate is connected to the row driving circuit 280, a drain is connected to the amplification transistor 226, and a source is connected to the vertical signal line 219. The row driving circuit 280 outputs the electric signals to the pixel circuits 220 in the rows by selectively selecting one pair of rows and turning on all the select transistors 227 in the selected rows.

In addition, the constant current circuit 230 includes, for example, a MOS transistor 231. A predetermined voltage (for example, 3 volts) is applied to a gate of the MOS transistor 231, a drain of the MOS transistor 231 is connected to the vertical signal line 219, and a source of the MOS transistor 231 is grounded. The constant current circuit 230 is connected to each pixel circuit 220 in the row via the vertical signal line 219.

Figure 5:
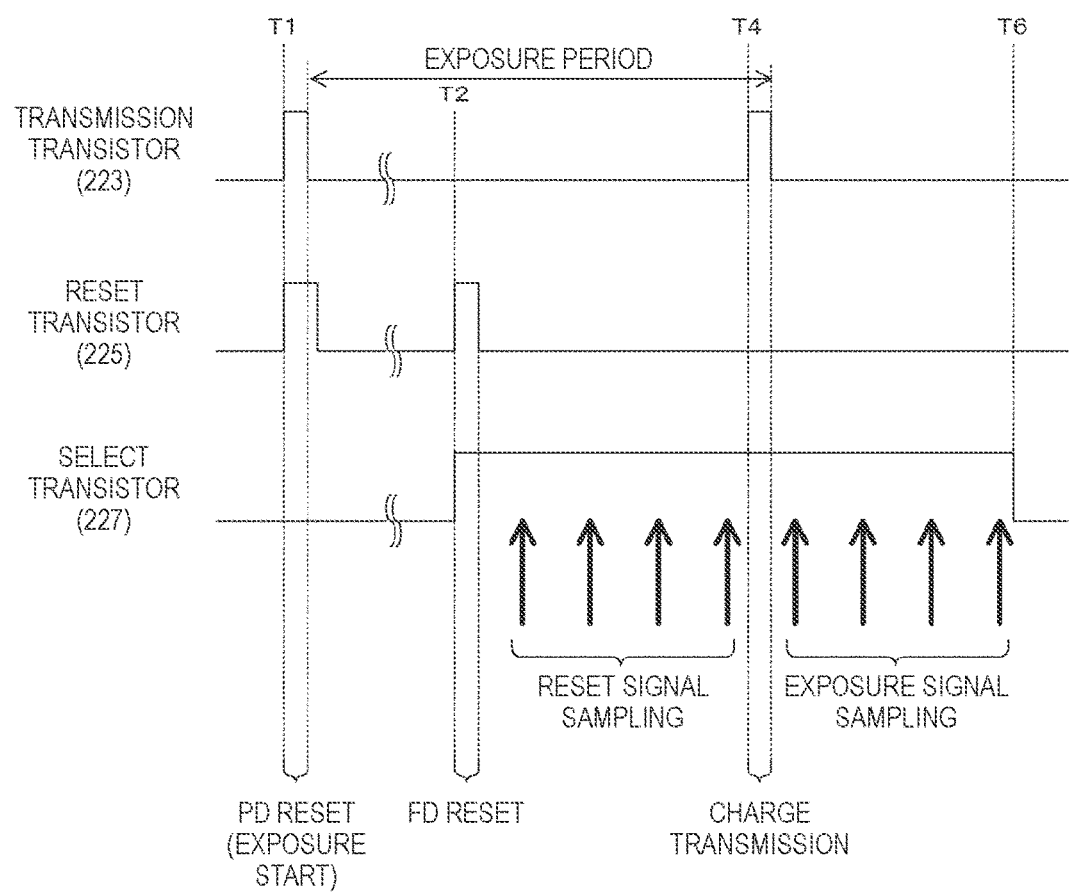
FIG. 5 is a timing chart illustrating an operation example of the pixel circuit according to the first embodiment.

FIG. 5 is a timing chart illustrating an operation example of the pixel circuit 220 according to the first embodiment.

The row driving circuit 280 controls the transmission transistor 223 and the reset transistor 225 such that the transmission transistor 223 and the reset transistor 225 are turned on at a timing T1 immediately before an exposure period. Through this control, the charge stored in the storage node 222 between the photodiode 221 and the transmission transistor 223 is all discharged to the power supply. This control is referred to as "photodiode (PD) reset" below. Thereafter, the row driving circuit 280 controls the transmission transistor 223 such that the transmission transistor 223 is turned off. Through this control, the storage node 222 enters a floating state and new charge storage starts. In addition, the row driving circuit 280 controls the reset transistor 225 such that the reset transistor 225 is turned off after the PD reset. Also, during charge storage, the reset transistor 225 may remain on. On the other hand, the select transistor 227 is controlled to be turned off to be accessible to the other pixel circuit 220 connected to the vertical signal line 219.

Then, at a timing T2 before end of the exposure period, the row driving circuit 280 controls the reset transistor 225 and the select transistor 227 such that the reset transistor 225 and the select transistor 227 are turned on. By controlling the select transistor 227, the selected pixel circuit 220 is connected to the vertical signal line 219. In addition, by controlling the reset transistor 225, the detection node 224 which is an input of the amplification transistor 226 and the power supply are short-circuited. Thus, a standard potential is generated in the selected pixel circuit 220.

When a pulse period elapses from the timing T2, the row driving circuit 280 controls the reset transistor 225 such that the reset transistor 225 is turned off. Through this control, the potential of the detection node 224 is coupled with the gate of the reset transistor 225, is slightly lowered from the standard potential, and enters a floating state. Further, at this time, significant kTC noise occurs in the detection node 224. Since a floating diffusion layer is generally used as the detection node 224, this control is referred to as "FD reset" below.

Between the FD reset and the end of the exposure period, the detection circuit 240 performs sampling a plurality of times (for example, 4 times). In this sampling, a signal of the potential of the vertical signal line 219 is converted as a reset signal into a digital signal Ds1 by the detection circuit 240. Multiple sampling of the reset signal is treated as first reading in correlated double sampling.

Then, at a timing T4 immediately before the end of the exposure period, the row driving circuit 280 controls the transmission transistor 223 such that the transmission transistor 223 is turned on. Through this control, the charge stored in the storage node 222 is transmitted to the detection node 224. At this time, when the potential of the detection node 224 is sufficiently deep, all the electrons stored in the storage node 222 are transmitted to the detection node 224 and the storage node 222 enters a fully depleted state. When a pulse period elapses from the timing T4, the row driving circuit 280 controls the transmission transistor 223 such that the transmission transistor 223 is turned off. Through this control, the potential of the detection node 224 drops by the amount of stored charge further than before the driving of the transmission transistor 223 (that is, the potential becomes shallow). The voltage equivalent to the drop is amplified by the amplification transistor 226 to be output to the vertical signal line 219.

Between the time at which the transmission transistor 223 is controlled to be turned off and a timing T6, the detection circuit 240 performs sampling a plurality of times (for example, 4 times). In this sampling, a signal of the potential of the vertical signal line 219 is converted as a storage signal into a digital signal Ds2 by the detection circuit 240. Multiple sampling of the storage signal is treated as second reading in correlated double sampling.

The detection circuit 240 compares the sampled storage signal (that is, the digital signal Ds2) to the reset signal (that is, the digital signal Ds1) and determines an incident photon amount on the basis of the comparison result. The plurality of digital signals Ds1 are all added and an average value of the digital signals Ds1 is calculated as necessary. Similarly, the digital signals Ds2 are all added to be averaged as necessary. The detection circuit 240 obtains a difference between the added value (or the average value) of the digital signals Ds1 and the added value (or the average value) of the digital signals Ds2 as a net storage signal. The kTC noise occurring at the time of the FD reset is offset by calculating the difference between the digital signals Ds1 and Ds2 as the net storage signal.

The exposure period of each pixel circuit 220 is a period between the reset operation and the reading operation described above and is, to be exact, a period in which the transmission transistor 223 is reset and subsequently turned off and then turned on in the reading. When the photons are incident on the photodiode 221 during the exposure period and charge is generated, the charge is a difference between the reset signal and the stored signal and is derived by the detection circuit 240 in the above-described procedure. When the charge is used in radiation counting, the read rows are preferably subjected to the PD reset instantly a time from end of the exposure to start of subsequent exposure is a dead period. Alternatively, the PD reset may be omitted. When the PD reset is omitted, subsequent charge storage in the photodiode starts immediately after transmission of the charge in completion of the exposure. That is, the dead time of the radiation counting is zero. In addition, a storage time is decided in accordance with a frame rate.

Figure 6:
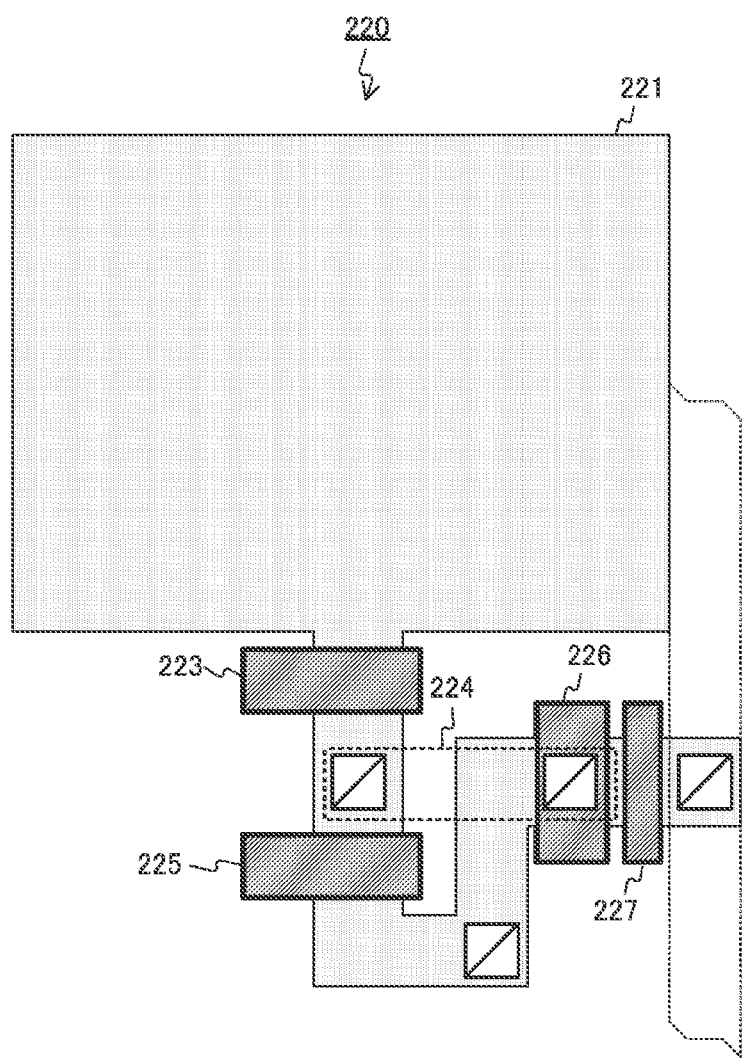
FIG. 6 is a diagram schematically illustrating an example of the layout of the pixel circuit according to the first embodiment of the present technology.

FIG. 6 is a diagram schematically illustrating an example of the layout of the pixel circuit according to the first embodiment of the present technology. The basic circuit or the operation mechanism of the pixel circuit 220 described above is the same as that of a pixel in a normal complementary MOS (CMOS) imager and variations thereof can be diverse. Here, the pixels assumed in the invention are designed so that conversion efficiency is relatively considerable. Specifically, to raise the conversion efficiency, the layout is devised so that parasitic capacitance of the storage node 222 on the input side of an amplifier forming the source follower is decreased to an utmost limit. For example, an occupation area of a diffusion layer or a wiring included in the storage node 222 is miniaturized as much as possible.

In contrast, the area of the photodiode 221 is enlarged as much as possible. Impurities are designed carefully so that potential gradually becomes deeper from the periphery of the photodiode 221 to the transmission transistor. Accordingly, a minute signal in one electron unit generated by the photodiode 221 is transmitted quickly toward the detection node 224. That is, by designing a potential appropriate for a full depletion type embedded pixel, signal charge can be fully transmitted to the detection node 224.

For example, while the conversion efficiency is raised up to 200 microvolts ($\mu V$)/e$^-$, random noise of the amplification transistor 226 or random noise of a peripheral circuit is suppressed to a total of 100 $\mu V$ rms using multiple sampling or the like. As a result, noise of each pixel circuit 220 is suppressed up to 0.5 e$^-$ or less.

[Configuration Example of Detection Circuit]

Figure 7:
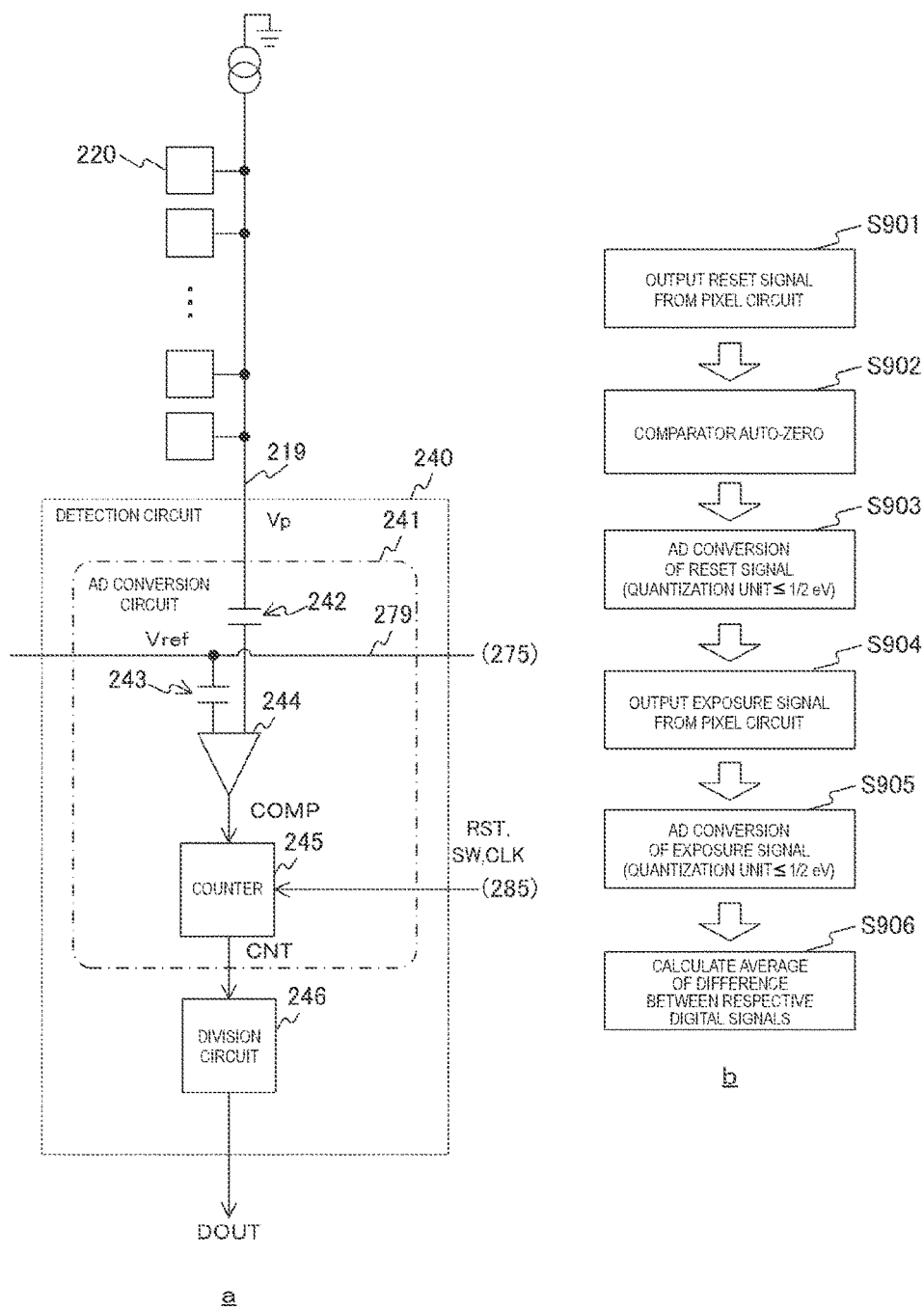
FIG. 7 is a diagram illustrating a functional configuration example of a detection circuit and an operation example of the detection circuit according to the first embodiment.

FIG. 7 is a diagram illustrating a functional configuration example of the detection circuit 240 and an operation example of the detection circuit according to the first embodiment. The detection circuit 240 includes an AD conversion circuit 241 and a division circuit 246.

The AD conversion circuit 241 converts the reset signals and the storage signals into digital signals in order (that is, performs sampling) under the control of the timing control circuit 285. The AD conversion circuit 241 includes capacitors 242 and 243, a comparator 244, and a counter 245. Also, the AD conversion circuit 241 is an example of an analog-to-digital conversion circuit described in the claims.

The capacitor 242 is connected to the vertical signal line 219 and one of two input terminals of the comparator 244.

The capacitor 243 is connected to the other of the two input terminals of the comparator 244 and a reference signal line 279. In addition, the capacitances of the capacitors 242 and 243 are substantially the same as each other and these capacitors are also referred to as coupling capacitors.

The comparator 244 compares an output voltage Vp of the vertical signal line 219 to the reference voltage $V_{ref}$ of the reference signal line 279. In multiple sampling of the reset signal, a reset potential of the reset signal is output as the output voltage Vp. In multiple sampling of the storage signal, a signal potential of the storage signal is output as the output voltage Vp. The comparator 244 supplies a comparison result COMP to the counter 245. For example, when the output voltage Vp is higher than the reference voltage $V_{ref}$, the comparison result COMP with a high level is output. Otherwise, the comparison result COMP with a low level is output. In addition, the comparator 244 has an auto-zero function of short-circuiting the two input terminals from an internal node to maintain an equilibrium state.

The counter 245 counts a count value on the basis of the comparison result COMP of the comparator 244. For example, the counter 245 can switch between up-counting of increasing a count value and down-counting of decreasing a count value to perform the counting.

A detection control signal from the timing control circuit 285 includes an initialization instruction signal RST for resetting a count value of the counter 245 to an initial value and a switching instruction signal SW for giving an instruction to switch one of the up-counting and the down-counting to the other thereof. In addition, the detection control signal includes a clock signal CLK with a predetermined frequency.

The counter 245 sets the count value to the initial value when the initialization instruction signal RST is supplied. In addition, the counter 245 performs one of the up-counting and the down-counting in accordance with the switching instruction signal SW. In addition, when the output voltage Vp is higher than the reference voltage $V_{ref}$ (that is, the comparison result COMP has the high level), the counter 245 performs the up-counting or the down-counting in synchronization with the clock signal CLK. The counter 245 supplies a count value CNT to the division circuit 246.

Here, when a net storage signal generated from one photon is defined as a "one-photon signal," an analog reset signal and the storage signal are converted into digital signals in a quantization unit less than a voltage of a one-photon signal.

In the case of the pixel circuit 220 subjected to low noise by adjusting the conversion efficiency or the like without performing Geiger amplification such as SiPM, there is significant noise before and after 0.5 e– rms for each pixel on an output particularly due to 1/f noise of the amplification transistor 226. In this configuration, when the AD conversion circuit 241 performs quantization using a one-photon signal as a quantization unit, an error between the number of actual photons and the number of photons indicated by the digital signal may be large.

Accordingly, the AD conversion circuit 241 performs quantization on the reset signal and the storage signal in a quantization unit less than a one-photon signal. The quantization unit is preferably set to be half or less of a one-photon signal and is further preferably set to be ¼ or less of a one-photon signal.

[Operation Example of Detection Circuit]

FIG. 7b is a diagram illustrating an operation example of the detection circuit 240 according to the first embodiment. The selected pixel circuit 220 outputs the reset signal to the vertical signal line 219 under the control of the row driving circuit 280 (step S901).

In addition, the two inputs in the comparator 244 are short-circuited from an internal node to maintain an equilibrium state by the auto-zero function of the comparator 244, and charge amounts of the capacitors 242 and 243 are adjusted in accordance with the equilibrium state. Accordingly, the vertical signal line 219 and the reference signal line 279 enters an effective equilibrium state (step S902).

The reference voltage generation circuit 275 supplies a sweep signal for changing (for example, decreasing) the reference voltage $V_{ref}$ to the reference signal line 279 at a constant speed over a plurality of times. The comparator 244 compares the voltage ($V_{ref}$) of the sweep signal to the reset potential of the reset signal. The timing control circuit 285 controls the counter 245 to initialize the count value. The counter 245 performs counting on the basis of an inversion timing of the comparison result COMP. Thus, the AD conversion is performed to convert the reset signal into the digital signal Ds1 (step S903).

The voltage Vp of the vertical signal line 219 and the voltage $V_{ref}$ of the reference signal line 219 are controlled to the effective equilibrium state through the auto-zero operation of step S902. Therefore, in step S903, the voltage subjected to the AD conversion is actually an offset occurring inside the comparator 244. The AD conversion is performed a plurality of times. In the AD conversion, for example, a count value is added through down-counting.

Then, the pixel circuit 220 outputs the storage signal to the vertical signal line 219 under the control of the row driving circuit 280 (step S904).

The reference voltage generation circuit 275 supplies the sweep signal over a plurality of times again and the comparator 244 compares the voltage ($V_{ref}$) of the sweep signal to the signal potential of the storage signal. The timing control circuit 285 controls the counter 245 and switches the down-counting to the up-counting. The counter 245 performs counting on the basis of an inversion timing of the comparison result COMP. Thus, the AD conversion is performed to convert the storage signal into the digital signal Ds2 (step S905).

Since the counter 245 switches the down-counting to the up-counting in step S905, a difference between the count value of the up-counting and the count value of the down-counting is output in step s905. The offset voltage of the comparator or the kTC noise at the time of the reset is removed by taking a difference between the digital signals Ds1 and Ds2.

The division circuit 246 calculates the average value of the difference (CNT) as a net pixel signal (step S906). After step S906, the detection circuits 240 and 260 end the detection operation.

Figure 8:
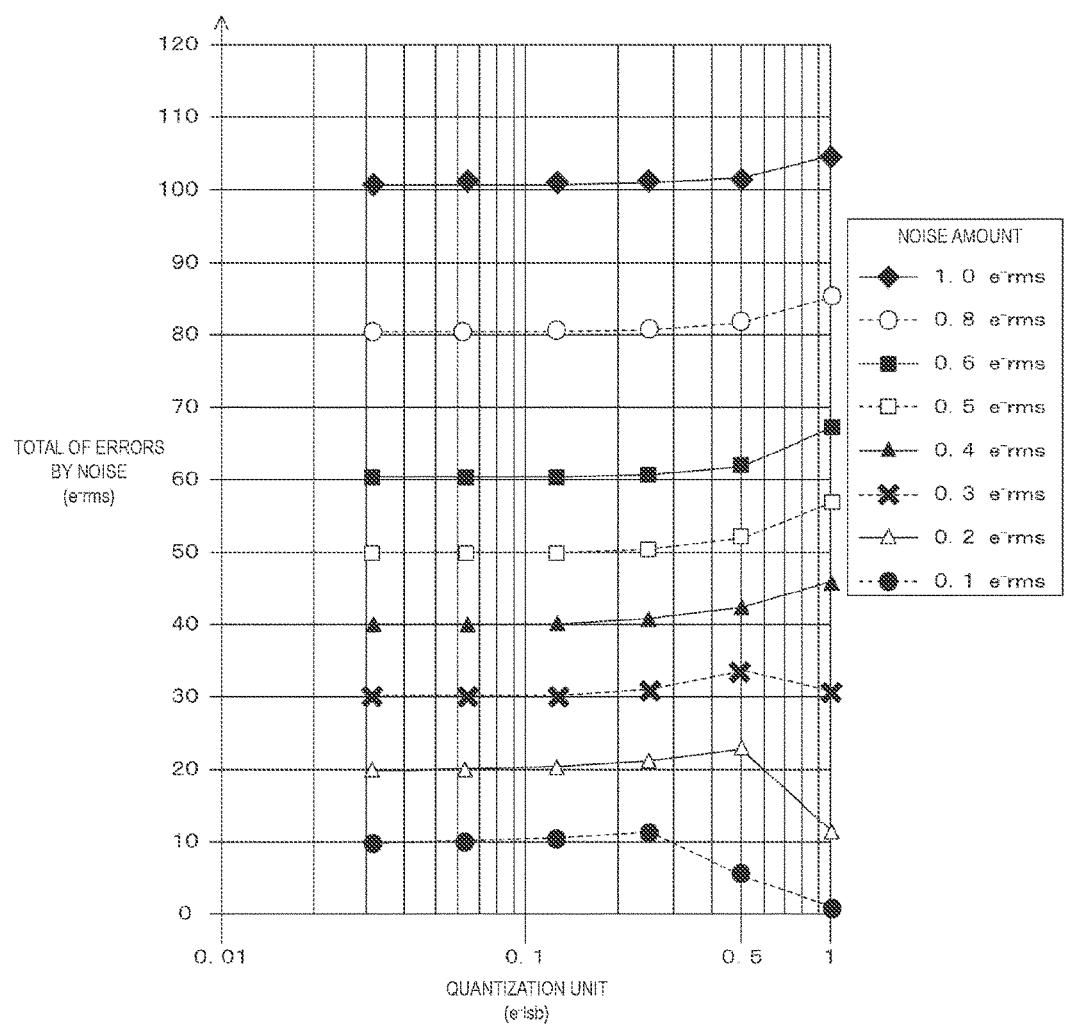
FIG. 8 is a graph illustrating an example of a total of errors in each quantization unit according to the first embodiment.

FIG. 8 is a graph illustrating an example of a total of errors in each quantization unit according to the first embodiment. The total of errors is equivalent to floor noise occurring in the pixel array unit 210 in a dark state. For example, a predetermined number of (for example, 10000) real number P indicating the value of the output voltage Vp from the pixel circuit 220 is generated by the following equation:

$$P = \text{NORMINV}(\text{RAND}(\,), Av, s).$$

In the foregoing equation, RAND( ) is a function of generating a random number. In addition, NORMINV( ) is a function of returning a value of an inverse function of a cumulative distribution function of a normal distribution in regard to an average value Av and a standard deviation s when the cumulative distribution function is set in a first term. By setting RAND( ) as the cumulative distribution function, a random number in accordance with the normal distribution of the average value Av and the standard deviation s is generated. A value in accordance with a noise amount is set in the standard deviation s. For example, when noise with a level of half of a one-photon signal occurs, 0.5 is set as s.

Then, a value of a digital signal DOUT obtained by quantizing the corresponding analog output voltage Vp is obtained for each of the generation numbers P by the following equation:

$$DOUT=ROUND(P/LSB,0) \times LSB.$$

In the foregoing equation, ROUND( ) is a function of rounding off the first term in ( ) to the number of digits of the second term. When the first term is rounded off at the first decimal place, for example, "1" is set in the second term. In addition, LSB indicates a quantization unit. When the quantization unit is set to half of a one-photon signal, for example, "0.5" is set in LSB.

A total of errors of the digital value DOUT obtained for each real number P is indicated by, for example, a root-mean-square of DOUT. In FIG. 8, the vertical axis represents the root-mean-square. In addition, the horizontal axis of the drawing represents a quantization unit.

As illustrated in FIG. 8, an error is larger when the level of noise in each pixel circuit 220 is higher. Further, when the noise exceeds 0.3 times the quantization unit, a quantized error associated with the quantization is added to the noise. Therefore, the error is larger when the quantization unit is larger.

On the other hand, detection in a quantization unit which is 1 times a one-photon signal is equivalent to so-called photon counting used in SiPM or Patent Literature 2. When a noise average is sufficiently small, remaining noise is filtered by the photon counting and is rounded off to almost zero. However, when the noise is equal to or less than 0.2 times a one-photon signal, this effect appears. On the other hand, in a light detector which does not use a photoelectric conversion element that does not perform avalanche amplification, it is not easy to suppress noise to that level. Noise exceeding 0.3 times a one-photon signal may normally occur. In this case, in photon counting, noise is input as photons and is erroneously determined in many cases, and thus an error may actually get worse. That is, a quantized error appears and the error exceeds the filtering effect.

The invention is based on recognition that very minute light can be detected with high precision by suppressing noise to a constant theoretical value range without using the filtering effect obtained by such photon counting. A theoretical value of an error is a square root of a square total of noise amounts when a quantization unit is infinitesimal (that is, a quantized error is 0). The theoretical value is, for example, 100 e⁻ rms in a sample of 10000 times 1.0 e⁻ rms. In the invention, the quantization unit is preferably set to a constant value or less since detection precision is ensured using the theoretical value as a standard.

As shown here, an error can sufficiently approach the theoretical value when the quantization unit is half or less of a one-photon signal. In particular, when the quantization unit is set to be equal to or less than ¼ of a one-photon signal, the total of errors is 10% or less of the theoretical value and deterioration in a variation due to the quantization unit is almost suppressed.

Accordingly, the quantization unit is preferably set to half or less of a one-photon signal and is further preferably set to ¼ or less of a one-photon signal.

Figure 9:
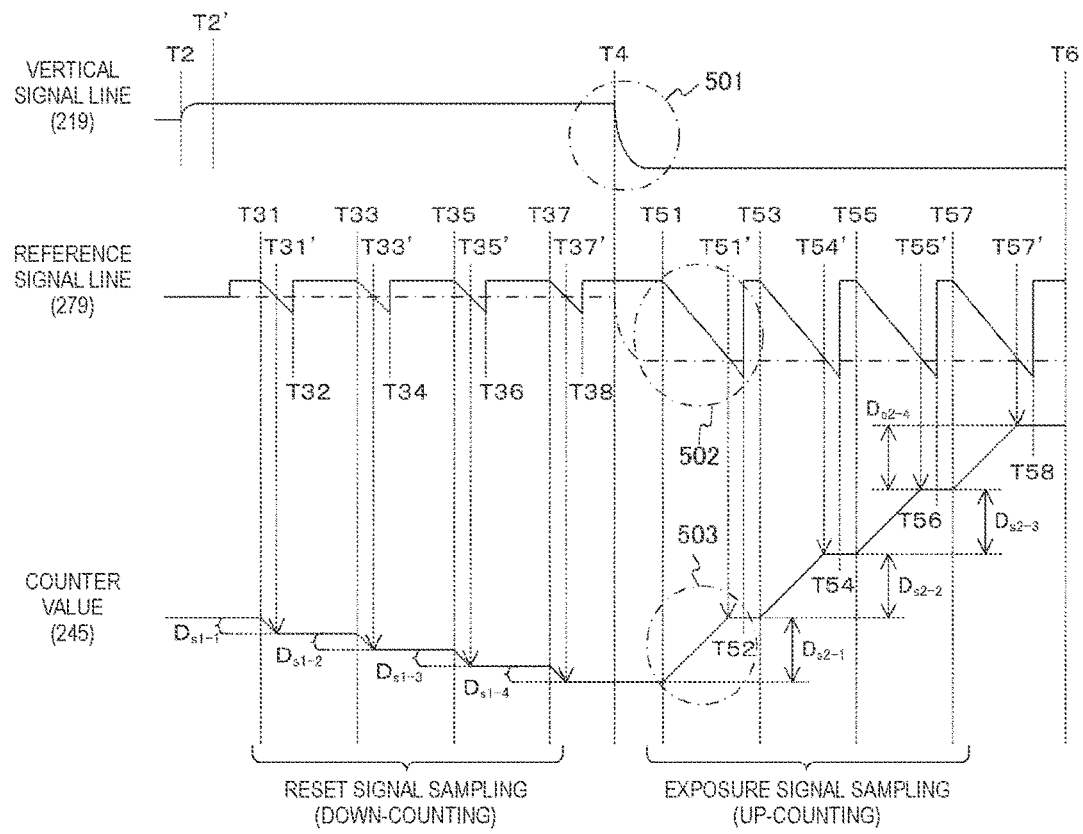
FIG. 9 is a timing chart illustrating an operation example of the light detector according to the first embodiment.
Figure 9:
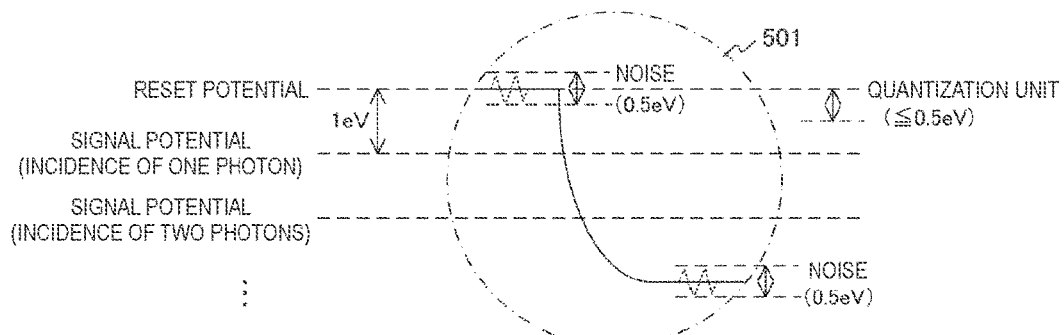

FIG. 9a is a timing chart illustrating an operation example of the light detector 200 according to the first embodiment.

At the timing T2, the row driving circuit 280 performs the FD reset. At a timing T2' at which a pulse period elapses from the timing T2, the pixel circuit 220 outputs a reset signal via the vertical signal line 219. In addition, at the timing T2, the timing control circuit 285 supplies the initialization instruction signal RST to the counter 245 to initialize the count value.

Here, the voltage of each of the vertical signal line 219 and the reference signal line 279 enters the equilibrium state almost effectively at the timing T2' due to the auto-zero function of the comparator 244. In FIG. 9a, a one-dot chain line indicates a change in a relative voltage of the vertical signal line 219 to the reference signal line 279 which is in the equilibrium state.

A constant offset voltage at the timing T2 is generated in the reference signal line 279. The reference voltage generation circuit 275 supplies the sweep signal from each of a plurality of sampling timings for the reset signal over a constant period. When sampling of the reset signal is performed 4 times, the supply of the sweep signal starts at each of sampling timings T31, T33, T35, and T37 of the reset signal. Then, at timings T32, T34, T36, and T38 at which constant periods from the sampling timings elapse, the reference voltage generation circuit 275 stops supplying the sweep signal.

In addition, the timing control circuit 285 supplies the clock signal CLK to the counter 245 and causes the counter 245 to count the count value over a period in which the sweep signal is supplied (T31 to T32 or the like), and stops supplying the clock signal CLK during other periods.

The counter 245 performs down-counting over a period in which the reference voltage $V_{ref}$ is higher than the voltage Vp of the vertical signal line 219 during the period in which the sweep signal is supplied (T31 to T32 or the like). This is performed by means such as blocking of clock supply to the counter with inversion of an output of the comparator. For example, at a timing T31' between the timings T31 and T32, the down-counting is performed from the timings T31 to T31' when the reference voltage $V_{ref}$ is equal to or less than the voltage of the vertical signal line 219. Since the reference voltage $V_{ref}$ is equal to or less than the voltage of the vertical signal line 219 between the timings T31' to T32, the count value is maintained without performing the down-counting. In addition, since the clock signal CLK is not supplied from the timing T32 to the timing T33 of subsequent sampling, the count value is similarly maintained without performing the down-counting.

Between timings T33 to T34, timings T35 to T36, and timings T37 to T38, the down-counting is similarly performed over a period in which the reference voltage $V_{ref}$ is higher than the voltage of the vertical signal line 219.

In addition, the pixel circuit 220 outputs the storage signal at the timing T4 at which charge is transmitted to the detection node 224. In addition, at the timing T4, the timing control circuit 285 switches the counting operation of the counter 245 from the down-counting to the up-counting in accordance with the switching instruction signal SW.

The reference voltage generation circuit 275 supplies the sweep signal over a constant period from each of a plurality of sampling timings of the storage signal. When the sampling of the storage signal is performed 4 times, the supply of the sweep signal starts at sampling timings T51, T53, T55, and T57 of the storage signal. Then, at timings T52, T54, T56, and T58 at which constant periods elapse from the sampling timings, the reference voltage generation circuit 275 stops supplying the sweep signal.

Here, when a change amount of the sweep signal is set as a sweep amount, a sweep amount at the time of sampling of the storage signal is set to a value greater than that at the time of sampling of the reset signal.

During a period in which the sweep signal corresponding to the storage signal is supplied (T51 to T52 or the like), the counter 245 performs the up-counting over a period in which the reference voltage $V_{ref}$ is higher than the voltage Vp of the vertical signal line 219.

At the timing T38 at which final sampling of the reset signal ends, the count value CNT is an integrated value of all the count values in the down-counting performed a plurality of times. For example, absolute values of the count values in the first sampling, the second sampling, the third sampling, and the fourth sampling of the reset signal are set as $D_{s1-1}$, $D_{s1-2}$, $D_{s1-3}$, and $D_{s14}$. In this case, the count value CNT at the timing T38 is an initial value $-D_{s1-1}-D_{s1-2}-D_{s1-3}-D_{s1-4}$.

In addition, since the counting operation is switched to the up-counting after the timing T4, the count value CNT is a difference between an integrated value of the down-counting and the integrated value of the up-counting at the timing T58 at which the final sampling of the storage signal ends. For example, absolute values in the first sampling, the second sampling, the third sampling, and the fourth sampling of the storage signal are set to $D_{s2-1}$, $D_{s2-2}$, $D_{s2-3}$, and $D_{s24}$. In this case, the count value CNT at the timing T58 is an initial value $-D_{s1-1}-D_{s1-2}-D_{s1-3}-D_{s1-4}+D_{s2-1}\pm D_{s2-2}+D_{s2-3}+D_{s2-4}$.

FIG. 9b is a diagram illustrating a relation among the reset potential of the reset signal, the signal potential of the storage signal, and the quantization unit. A potential difference between the reset potential and the signal potential at the time of incidence of one photon, that is, a voltage of a one-photon signal, is, for example, a value obtained by multiplying a potential change of the detection node 224 corresponding to injection of one-electron charge in the pixel circuit in FIG. 4 by a gain of the amplifier. When the gain is set to 1 to facilitate the description, the voltage of a one-photon signal is a potential change of the detection node 224 corresponding to injection of one-electron charge. When the gain is further multiplied in a path reaching from the pixel output (219) to the AD conversion circuit 241, a multiple of the gain is further obtained. The quantization unit in the AD conversion circuit 241 is set to equal to or less than half of the one-photon signal.

Figure 10:
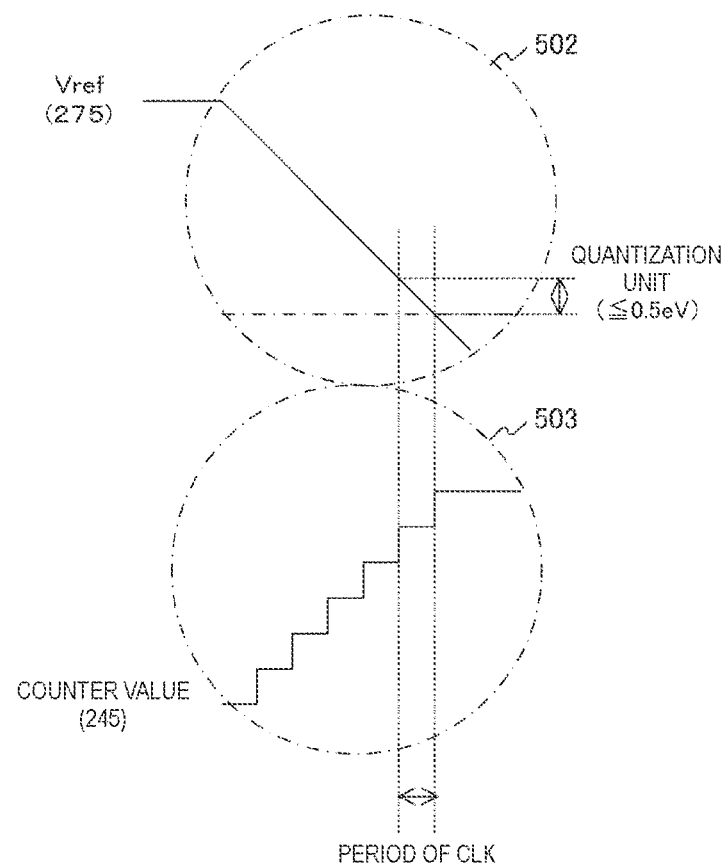
FIG. 10 is a diagram for describing the quantization unit according to the first embodiment.

FIG. 10 is a diagram for describing the quantization unit according to the first embodiment. As described above, the counter 245 counts a counter value in synchronization with the clock signal CLK and the reference voltage generation circuit 275 supplies the sweep signal during the counting. A change amount of the sweep signal within the period of the clock signal CLK is equivalent to the quantization unit.

Next, performance when a survey meter is constructed using the above-described radiation counting device 100 will be estimated. In general, an energy resolution R in radiation scintillation detection is expressed in the following equation. Here, the energy resolution is expressed by, for example, full width at half maximum (FWHM):

$$R^2(E)=Rs^2(E)+Rp^2(E).$$

In the foregoing equation, Rs is a dispersion factor by the scintillator 120 and Rp is a dispersion factor by the light detector 200. The dispersion Rp is expressed by the following equation:

$$Rp^2(E)=5\ 0.56\times\{1/(N\times r)+s^2/(N\times r)^2\}.$$

In the foregoing equation, N is an average value of the number of photons incident on the light reception surface, r is quantization efficiency, and s is a standard deviation in accordance with random noise. In addition, the coefficient 5.56 is a conversion coefficient from an rms value to a half value width.

When noise of each pixel is assumed to be 0.5 e⁻ rms, a theoretical value of a total of noise in a 520×520 array is 260 e⁻ rms by the following equation:

$$(0.5^2\times520\times520)^{1/2}=260.$$

The theoretical value of the quantization unit of the AD conversion is ensured to be equal to or less than half of a one-photon signal (0.5 e⁻/lsb) and is preferably ensured to be equal to or less than ¼ of a one-photon signal. When a gamma ray of main 662 eV radiated from cesium (Cs) 137 is received from the scintillator 120 formed of, for example, sodium iodide (NaI):titanium iodide (TI), about 24,500 photons are generated. A variation in the photon amount includes about 6.5% FWHM as a factor unique to the scintillator 120.

In contrast, noise on a sensor side is sufficiently small. Thus, when a photomultiplier tube is used as a light sensor, favorably comparable measurement precision is expected to be obtained. The estimate details are summarized below:
single pixel noise: 0.5 e⁻ rms;
light reception surface size: 4 (mm)×4 (mm);
pixel size: 8 (μm)×8 (μm);
sensor noise: 260 e⁻ rms;
energy per photon: 37 key;
gamma ray energy: 662 leV;
average value N of number of incident photons: 24494;
quantization efficiency r: 0.8;
standard deviation s: 260;
dispersion factor Rp of light detector: 3.55%;
dispersion factor Rs of scintillator: 6.5%; and
energy resolution R: 7.41%.

In this way, according to the first embodiment of the present technology, the AD conversion circuit 241 can perform the AD conversion on a voltage from a pixel in a quantization unit less than a voltage generated from one photon, and therefore can accurately perform AD conversion even when noise occurs in the pixel. Thus, the radiation counting device 100 can accurately perform radiation counting.

2. Second Embodiment

In the above-described first embodiment, one light reception unit 110 including the scintillator and the light detector 200 is installed. The light reception unit 110 is also referred to as a head. When the radiation counting device 100 is used alone in a survey meter, measurement precision of the light emission amount is high. However, there is a problem of sensitivity being slightly low. That is, the volume of the scintillator 120 configured to have a bottom surface of a square of 4 mm corresponding to the light reception surface of the light detector 200 is slightly small and a probability of incidence of radiation is lowered to that extent, and thus detection sensitivity is slightly low.

However, to expand the bottom surface of the scintillator 120 and improve sensitivity, it is necessary to expand the light reception surface of the light detector 200 and increase the number of driving pixels. Thus, a total of noise and a frame rate of the light detector 200 deteriorate. On the other hand, when the height of the scintillator 120 is increased to improve sensitivity, a considerable restriction is imposed on the shape of the detector (survey meter). Moreover, a frame rate of the detector is slightly insufficient when a dose is large. In view of such circumstances, when the detection sensitivity of the survey meter is desired to be improved, it is desirable to install a plurality of heads (that is, the light reception units 110) in the radiation counting device 100 and configure multiple heads without expanding the bottom surface of the scintillator 120 or the light reception surface of the light detector 200. The radiation counting device 100 according to the second embodiment is different from the radiation counting device according to the first embodiment in that a plurality of heads are installed.

Figure 11:
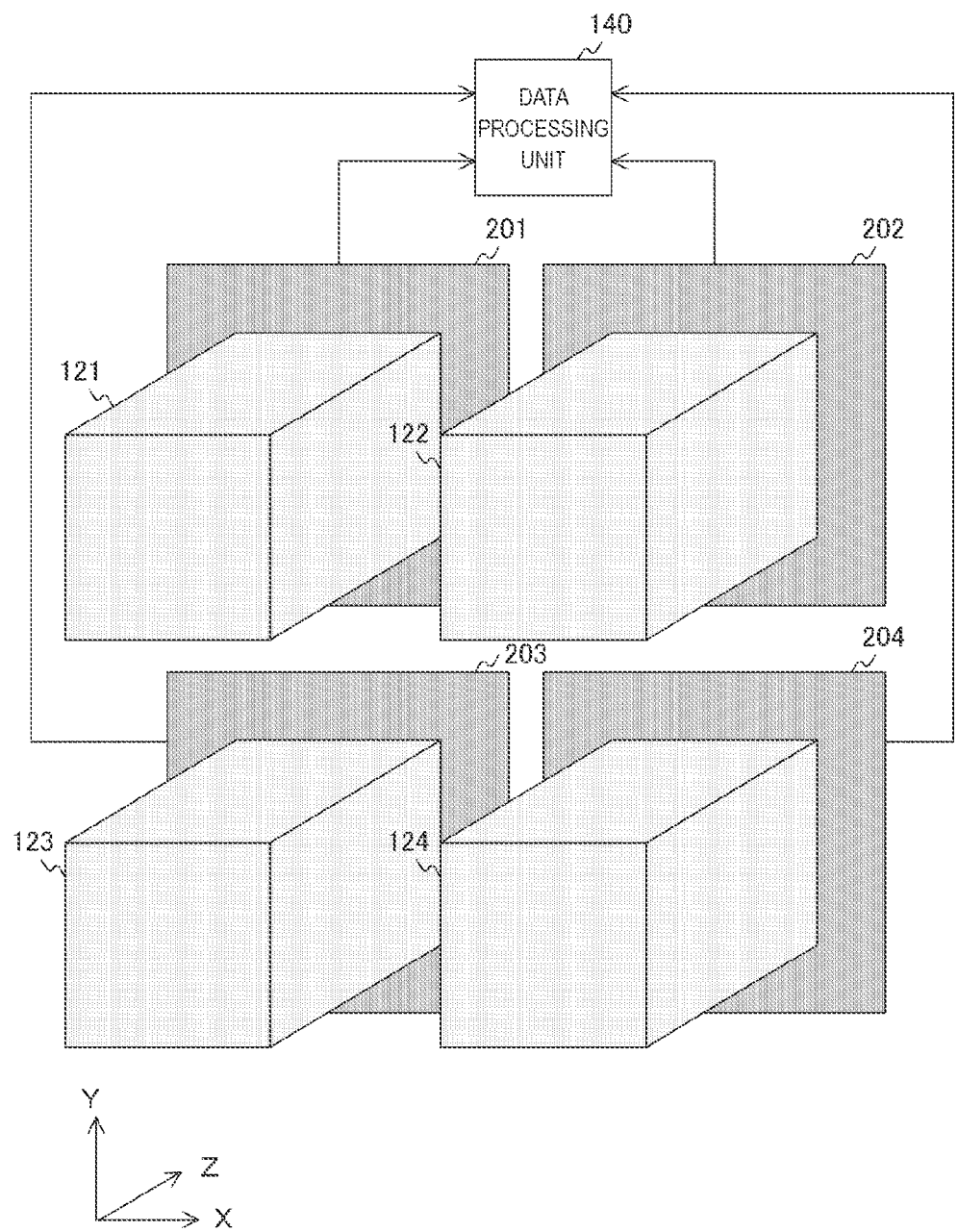
FIG. 11 is a diagram illustrating an overall configuration example of a radiation counting device according to a second embodiment.

FIG. 11 is a diagram illustrating an overall configuration example of the radiation counting device 100 according to the second embodiment. The radiation counting device 100 according to the second embodiment is different from the radiation counting device according to the first embodiment in that scintillators 121, 122, 123, and 124 and light detectors 201, 202, 203, and 204 are included instead of the scintillator 120 and the light detector 200.

The scintillator 121 is connected to the light detector 201 and the scintillator 122 is connected to the light detector 202. In addition, the scintillator 123 is connected to the light detector 203 and the scintillator 124 is connected to the light detector 204. The light detectors 201 to 204 are commonly connected to the data processing unit 140. Since outputs of the individual heads are digitized, it is possible to easily realize the multiple heads. The radiation counting device 100 may have a structure in which a head can be added in accordance with necessary sensitivity. The four light detectors (201 to 204) are assumed to be installed in different chips. Also, the light detectors may be integrated in one chip. In this case, four pixel array units disposed on the chip may all be operated simultaneously in parallel.

When sensitivity is quadrupled by setting the bottom surface of the scintillator to have a square of 8 millimeters (mm) simply in the radiation counting device 100 according to the first embodiment, the light reception surface is accordingly expanded, and the number of driving pixels is quadrupled, pixel noise of scintillation light is doubled and a frame rate is reduced to half. That is, a count rate is also halved and it is difficult to deal with a case in which a dose amount is large. In contrast, in the configuration of the multiple heads according to the first embodiment, neither the pixel noise nor the frame rate is changed. Moreover, the count rate of the radiation is actually quadrupled since the heads independently count radiation beams.

In this way, according to the second embodiment of the present technology, it is possible to improve detection sensitivity of light since the plurality of scintillators and the plurality of light detectors are installed.

3. Third Embodiment

In the above-described second embodiment, the radiation counting device 100 is assumed to be used as a survey meter, but the radiation counting device 100 may be used for a medical device. Examples of medical devices include a single photon emission computed tomography (SPECT) and a positron emission tomography (PET). In addition, the radiation counting device can also be applied to a transmissive X-ray imaging device. The medical device identifies and filters radiation for which positional information is lost due to diffusion inside a subject from energy. Accordingly, energy resolution is also important as in a survey meter.

In the medical device, the plurality of light reception units 110 are installed as in the second embodiment. In this case, the size of the bottom surface of the scintillator 120 can almost match the size of the light detector 200, and thus the plurality of light reception units can be spread out in the array shape at a pitch of about 2.5 mm. A notice point of the spread structure is a ratio (aperture ratio) of the light reception surface to the light detector 200. Photons generated in each scintillator 120 are incident on the light reception surface only at a ratio equivalent to the aperture ratio. For example, when the light reception surface of the light detector 200 is 2 millimeters (mm) with respect to a square of 2.5 millimeters (mm), the aperture ratio is 64 percent (%). As the aperture ratio is larger, an average value N of the numbers of incident photons is larger, and thus the energy resolution is improved.

For this reason, in the light detector 200, the AD conversion circuit 241 with the largest area in a peripheral circuit is preferably stacked in a lower layer of the light reception surface using a different silicon layer. The radiation counting device 100 according to the third embodiment is different from the radiation counting device according to the second embodiment in that the pixel circuit 220 and the AD conversion circuit 241 are installed in different substrates to be stacked.

Figure 12:
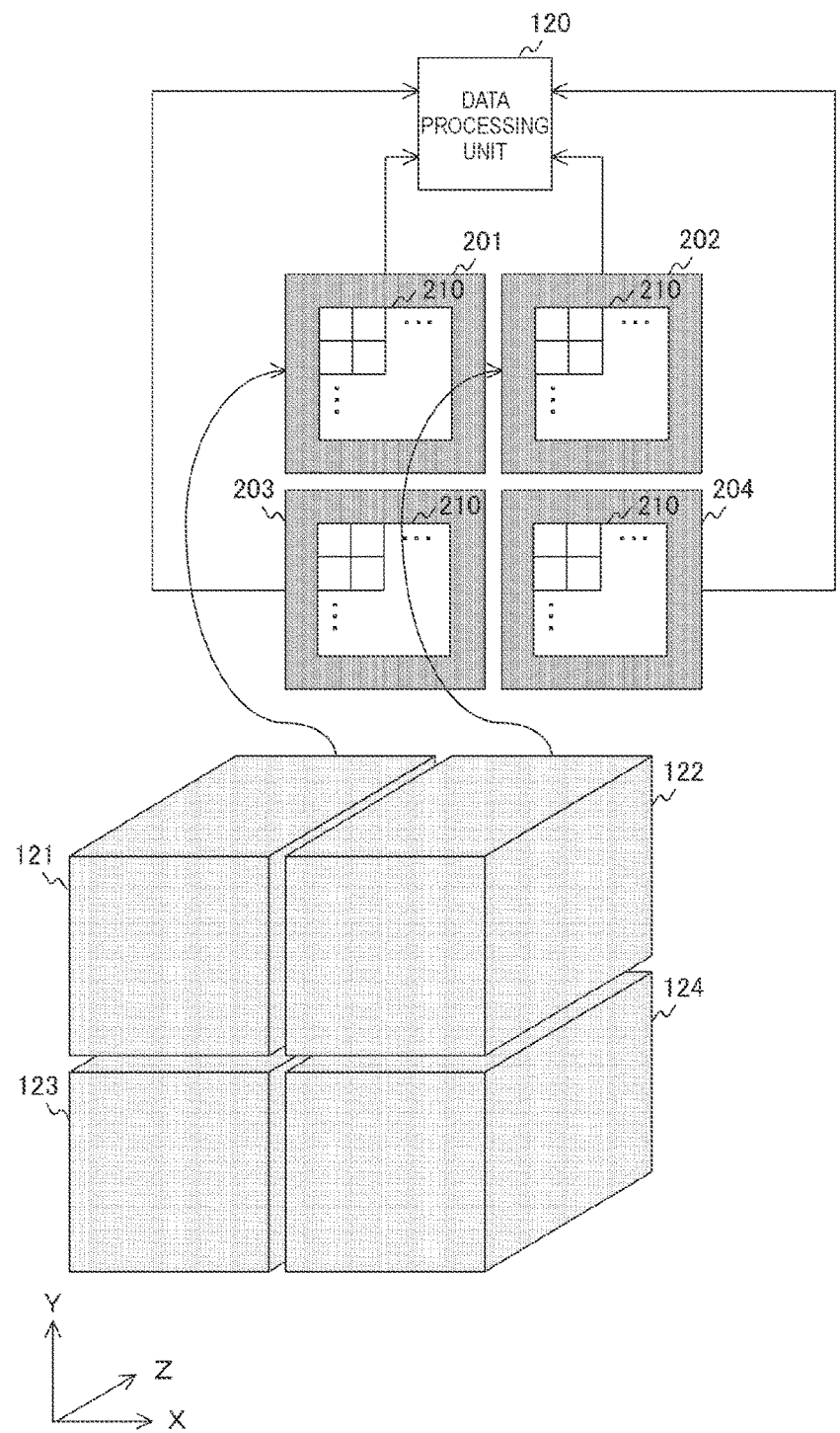
FIG. 12 is a diagram illustrating an overall configuration example of a radiation counting device according to a third embodiment.

FIG. 12 is a diagram illustrating an overall configuration example of the radiation counting device 100 according to the third embodiment. The radiation counting device 100 according to the third embodiment includes scintillators 121, 122, 123, and 124 and light detectors 201, 202, 203, and 204 as in the second embodiment. However, the radiation counting device 100 according to the third embodiment is different from the radiation counting device according to the second embodiment in that the size of the bottom surface of each scintillator almost matches the size of the light detector. The light reception units can be spread out in the array shape at a pitch of about 2.5 millimeters (mm).

Also, for example, a collimator (not illustrated) such as lead is disposed on a radiation incident surface of the light reception unit so that only vertically incident radiation reaches the scintillator. In addition, partition walls with a low refractive index or a reflection property are installed between the light reception units so that scintillation light does not leak to the nearby light reception units.

When radiation is incident on one of the scintillators 121 to 124, the scintillator emits light and a significant output is generated in the corresponding light detector. The data processing unit 140 can specify an incident position of the radiation on the light reception surfaces of the light reception units spread out in the array shape by processing a digital signal from each light reception unit. In this case, a spatial resolution unique to the radiation counting device 100 is 2.5 millimeters (mm) equivalent to a pitch of a detection module. This can be said to be good spatial resolution even when compared to SPECT of the related art using a photomultiplier tube. Also, the plurality of light detectors 200 may be integrated in one chip. In this case, for example, four pixel array units 210 disposed on the chip may all be simultaneously operated in parallel.

Figure 13:
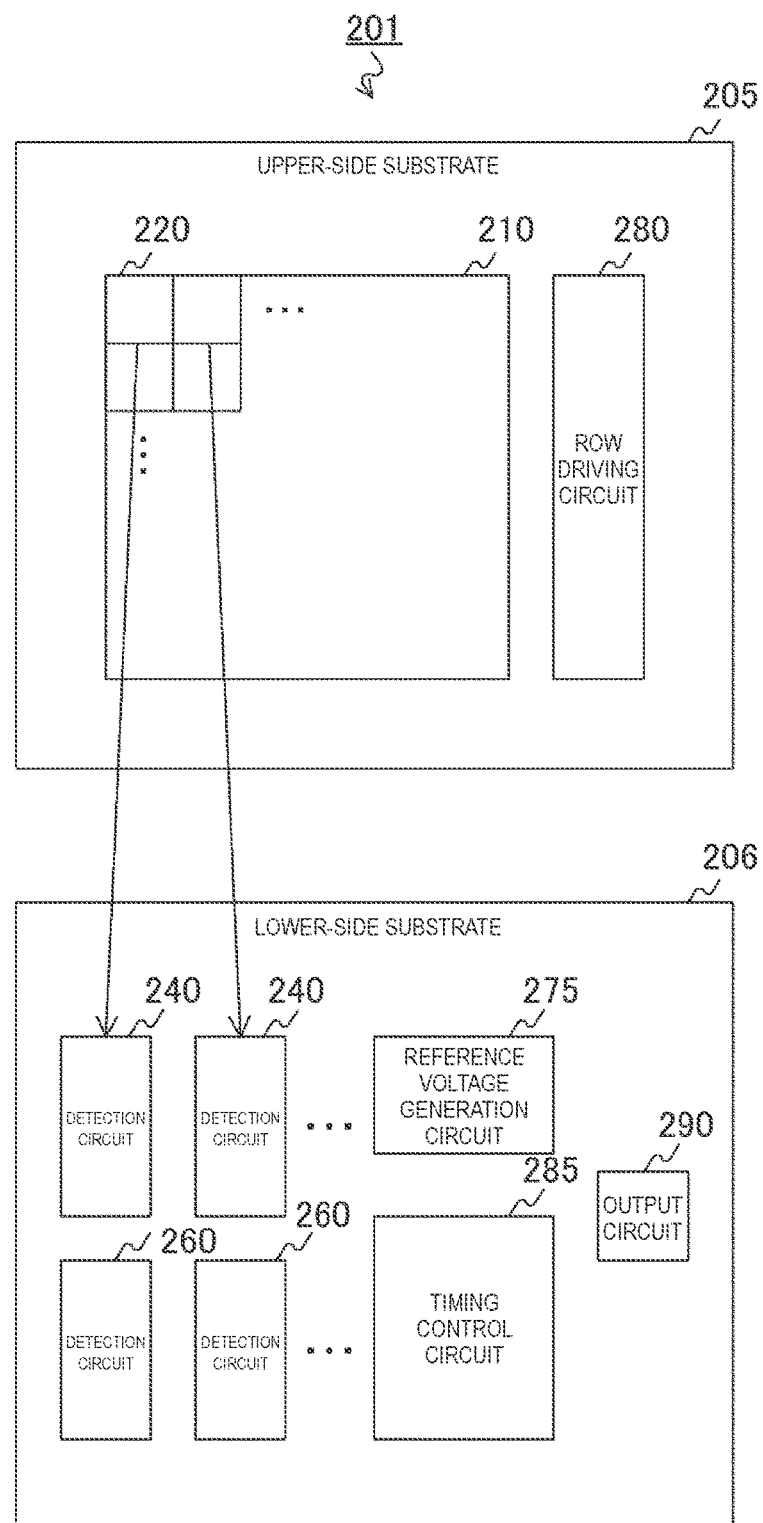
FIG. 13 is a block diagram illustrating a configuration example of a light detector according to the third embodiment.

FIG. 13 is a block diagram illustrating a configuration example of the light detector 201 according to the third embodiment. The light detector 201 includes an upper-side substrate 205 and a lower-side substrate 206. The pixel array unit 210 and the row driving circuit 280 are installed on the upper-side substrate 205. In addition, the detection circuits 240, the reference voltage generation circuit 275, the timing control circuit 285, the output circuit 290, and the like are installed on the lower-side substrate 206. These substrates are stacked using a silicon stacking technology such as laminating of a silicon wafer. The configurations of the light detectors 202 to 204 are the same as that of the light detector 201. Also, the upper-side substrate 205 is an example of a first substrate described in the claims and the lower-side substrate 206 is an example of a second substrate described in the claims.

Next, energy resolution of an SPECT device to which the radiation counting device 100 according to the third embodiment is applied will be estimated. An estimation procedure is the same as the procedure according to the first embodiment, but a radiation source is assumed to be technetium (Tc) and energy of a gamma ray is 140 eV. When NaI:Tl is used in the scintillator, generated scintillation light is proportional to the energy of the radiation and is about 5180 photons. In the embodiment, as described above, the light reception surface of the light detector is smaller than the bottom surface of the scintillator. Therefore, a numerical value N is lowered to 64% of the light emission amount of the scintillator, that is, 3315 photons.

To compensate for noise deterioration due to the factor, the size of the pixel circuit 220 is doubled to 16 micrometers (μm). The pixel size is obtained by expanding the photodiode 221 additionally, but it is necessary to design a potential carefully so that electrons drift smoothly inside the diode. Thus, an aperture ratio which is a ratio of the photodiode 221 in the pixel circuit 220 is improved. The 125×125 pixel circuits 220 are installed in the pixel array unit 210. When random noise of each pixel is set to 0.5 e$^-$ rms, a total of errors by the noise is 62.5 e$^-$ rms. The estimate details are summarized below:

single pixel noise: 0.5 e$^-$ rms;
light reception surface size: 2 (mm)×2 (mm);
pixel size: 16 (μm)×16 (μm);
sensor noise: 62.5 e$^-$ rms;
energy per photon: 37 key;
gamma ray energy: 140 leV;
average value N of numbers of incident photons: 3315;
quantization efficiency r: 0.9;
standard deviation s: 62.5;
dispersion factor Rp of light detector: 6.56%;
dispersion factor Rs of scintillator: 6.00%; and
energy resolution R: 8.89%.

In this way, by expanding the pixel size and stacking the circuits to improve the aperture ratio of the light reception surfaces, the energy resolution of SPECT is equal to that of a photomultiplier tube. Such semiconductor light detectors are mass-produced in the same manufacturing processes in the same manufacturing line as commercially available CMOS imagers. The radiation counting device 100 manufactured in this way is miniaturized and lightweight, is resistant to environmental changes and has stable properties, and thus maintenance is also easy. In addition, since the output is a digital signal, circuits on the rear stage may process only digital signals, it is also difficult to receive an influence of noise from the surroundings, and it is easy to process data output from the many light reception units.

In this way, according to the third embodiment of the present technology, the pixel circuits 220 and the detection circuits 240 are installed in the different substrates to be stacked. Therefore, it is possible to increase a ratio (aperture ratio) of the pixel array unit 210 in the light detector 200 and improve the energy resolution.

4. Fourth Embodiment

In the above-described first embodiment, the light detector 200 selects one pair of rows in order and exposes the pair of rows. However, all the rows may be simultaneously selected and exposed. Such control is referred to as a global shutter scheme. The light detector 200 according to the fourth embodiment is different from the light detector according to the first embodiment in that all the rows are simultaneously exposed.

Figure 14:
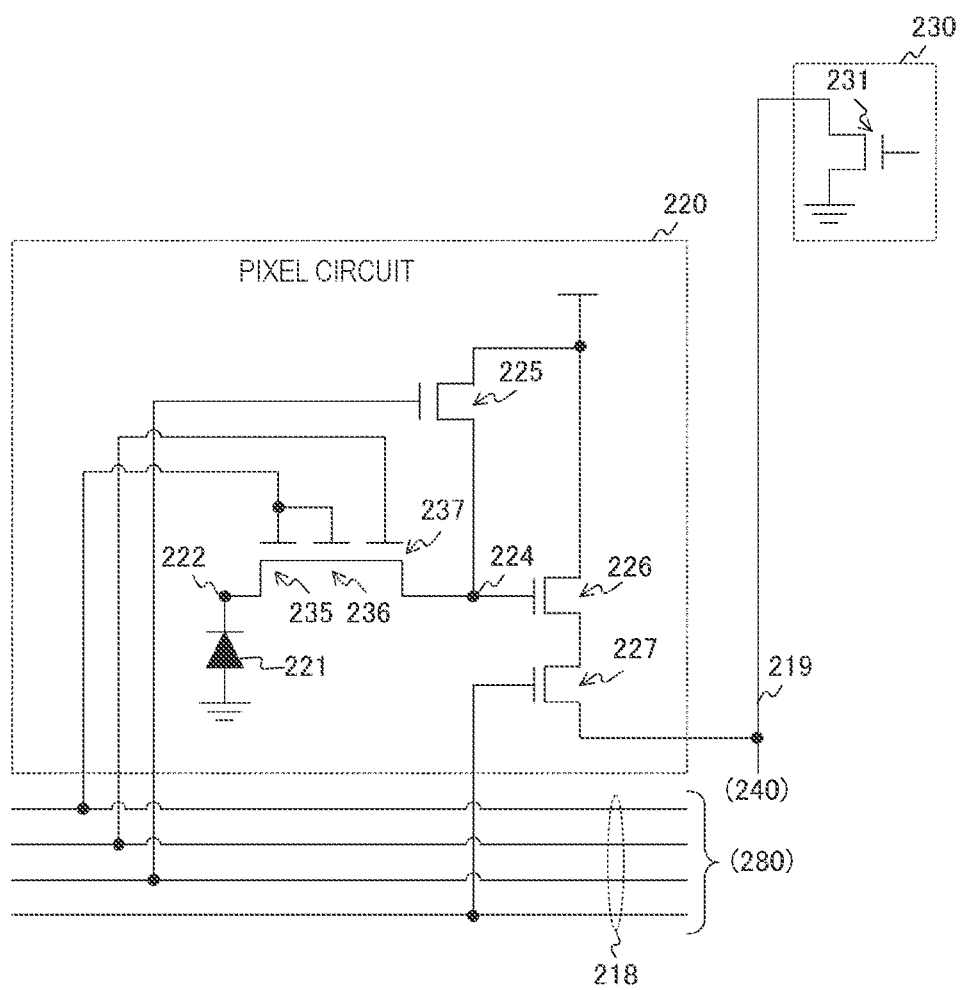
FIG. 14 is a circuit diagram illustrating a configuration example of a pixel circuit according to a fourth embodiment.

FIG. 14 is a circuit diagram illustrating a configuration example of the pixel circuit 220 according to the fourth embodiment. The pixel circuit 220 according to the fourth embodiment is different from the pixel circuit according to the first embodiment in that a transmission transistor 235, an intermediate node 236, and a transmission transistor 237 are included instead of the transmission transistor 223.

The transmission transistor 235, the intermediate node 236, and the transmission transistor 237 are 3-stage transistors that have series field effect transistor (FET) structures integrated without conductive diffusion layers between channels. In the transmission transistor 235, a source is connected to the photodiode 221 and a gate is connected to a gate of the intermediate node 236 and the row driving circuit 280. In the transmission transistor 237, a gate is connected to the row driving circuit 280 and a drain is connected to the detection node 224.

Of these transistors, the transmission transistor 235 transmits charge from the photodiode 221 to the intermediate node 236 under the control of the row driving circuit 280. Also, the transmission transistor 235 is an example of a first transmission unit described in the claims.

The intermediate node 236 is a MOS transistor that temporarily stores and retains a change in a channel. In the global shutter scheme, the intermediate node 236 is used as an analog memory. The gates of the transmission transistor 235 and the intermediate node 236 are driven en bloc. Here, a threshold is controlled such that the charge is transmitted from the photodiode 221 to the intermediate node 236 and a channel potential of the transmission transistor 235 is controlled to be shallower than that of the intermediate node 236.

The transmission transistor 237 transmits the charge from the intermediate node 236 to the detection node 224 under the control of the row driving circuit 280. Also, the transmission transistor 237 is an example of a second transmission unit described in the claims.

Figure 15:
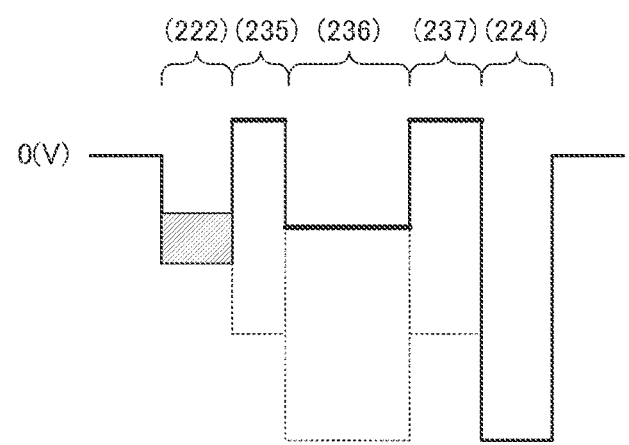
FIG. 15 is a diagram illustrating potentials to describe charge transmission to an intermediate node according to the fourth embodiment.
Figure 15:
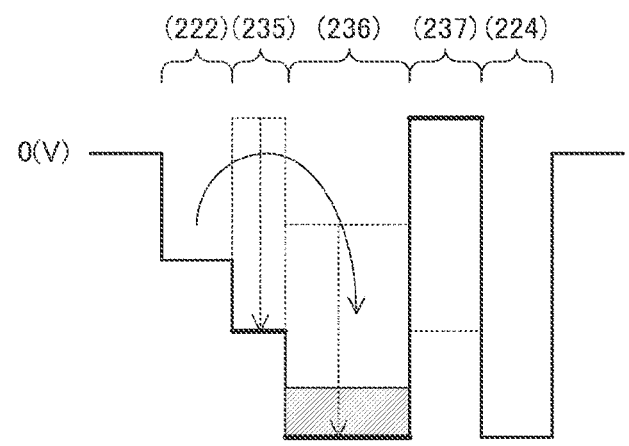

FIG. 15 is a diagram illustrating potentials to describe charge transmission to the intermediate node 236 according to the first embodiment. FIG. 15a is an example of a diagram illustrating a potential before transmission to the intermediate node 236 (analog memory). The charge is stored in the storage node 222 of the photodiode 221. In addition, both the intermediate node 236 and the detection node 224 are reset to a floating state.

FIG. 15b is an example of a diagram illustrating a potential after transmission to the intermediate node 236. When an exposure period ends, the row driving circuit 280 controls the transmission transistor 235 and the intermediate node 236 such that both the transmission transistor 235 and the intermediate node 236 are turned on. Through the control, signal charge is transmitted to the channel of the intermediate node 236.

Figure 16:
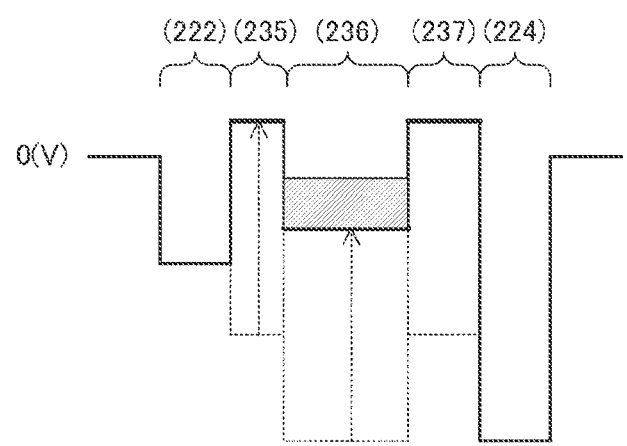
FIG. 16 is a diagram for describing charge transmission to a detection node according to the fourth embodiment.
Figure 16:
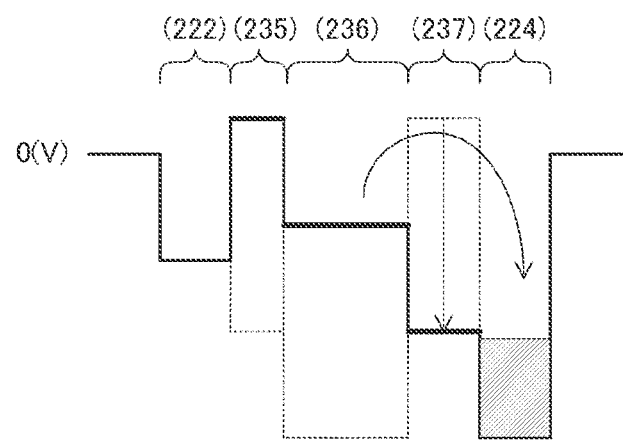

FIG. 16 is a diagram for describing charge transmission to the detection node 224 according to the fourth embodiment. FIG. 16a is an example of a diagram illustrating a potential before transmission to the detection node 224. When the transmission to the intermediate node 236 ends, the row driving circuit 280 controls the transmission transistor 235 and the intermediate node 236 such that both the transmission transistor 235 and the intermediate node 236 are turned off. In this state, reverse flow of the signal charge to the storage node 222 is prevented by a difference in a potential between the transmission transistor 235 and the intermediate node 236. Then, a reset signal is read.

FIG. 16b is an example of a diagram illustrating a potential after the transmission to the detection node 224. When the reset signal is read, the row driving circuit 280 controls the transmission transistor 237 such that the transmission transistor 237 is turned on. Through the control, the charge of the intermediate node 236 is transmitted to the detection node 224.

Figure 17:
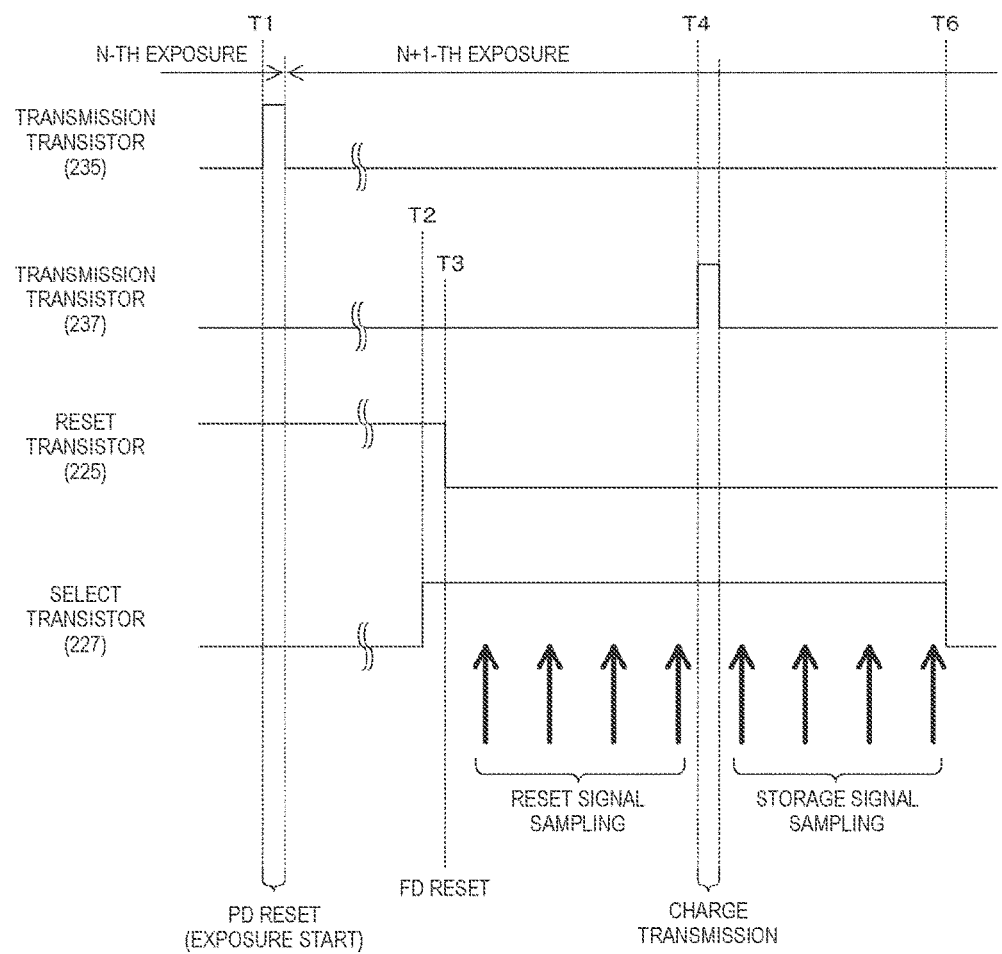
FIG. 17 is a timing chart illustrating an operation example of pixel circuits according to the fourth embodiment.

FIG. 17 is a timing chart illustrating an operation example of the pixel circuits according to the fourth embodiment. The row driving circuit 280 applies a pulse to the gates of the transmission transistor 235 and the intermediate node 236 at a timing T1 at the time of exposure start. This operation is performed simultaneously on all the pixel circuits 220 in the pixel array unit 210 en bloc and the signal charge of each pixel circuit 220 stored in the photodiode 221 is completely transmitted to the intermediate node 236 at the timing T1. Further, thereafter, subsequent exposure storage starts in the photodiode 221. That is, this control is the global shutter scheme. A dead time of the pixel circuit 220 is zero and a storage time is decided in accordance with a frame rate.

Here, the charge of the pixels transmitted to the intermediate node 236 en bloc is sequentially read for each pixel circuit 220 in a subsequently selected row.

The row driving circuit 280 selects one pair of rows at a timing T2, turns on the select transistors 227 while maintaining the reset transistors 225 so that the reset transistors 225 in the rows are turned on, and connects the selected pixel circuits 220 to the vertical signal line 219. By performing control such that the reset transistors 225 are turned on, the detection nodes 224 connected to the gates of the amplification transistors 226 and a power supply connected to the sources of the amplification transistors 226 are short-circuited. Thus, a standard reset potential is generated in the selected pixel circuits 220.

Subsequently, at a timing T3, the row driving circuit 280 controls the reset transistor 225 such that the reset transistor 225 is turned off and performs FD reset. At this time, the potential of the detection node 224 is coupled with the gate of the reset transistor 225, is slightly lowered from the standard potential, and enters a floating state. Further, at this time, significant kTC noise occurs in the detection node 224.

Here, first reading is performed by the detection circuit 240. For example, the reading is performed by sampling four times. That is, the potential appearing in the vertical signal line 219 is acquired as the reset signal of the detection node 224 4 times by the detection circuit 240.

Next, the row driving circuit 280 turns on the transmission transistor 237 at the timing T4. Through this control, electrons stored in the intermediate node 236 flow to the detection node 224. At this time, when the potential of the detection node 224 is sufficiently deep, all the electrons stored in the intermediate node 236 flow to the detection node 224. After a pulse period elapses, the row driving circuit 280 turns off the transmission transistor 237. As a result, the potential of the detection node 224 drops by the amount of stored charge further than before the transmission (that is, the potential becomes shallow). The voltage equivalent to the drop is amplified by the amplification transistor 226 to be output to the vertical signal line 219.

Here, second reading, that is, reading of the storage signal, is performed again a plurality of times (for example 4 times) through sampling. The detection circuit 240 acquiring the storage signal compares the earlier reset signal to the current storage signal and determines an incident photon amount. The sampling results of 4 times are added to the reset signal and the storage signal or are averaged. In the averaging work, random noise caused due to thermal noise is reduced to about ½. Further, kTC noise occurring at the time of the FD reset is offset by calculating the difference between the storage signal and the reset signal as the net storage signal.

Figure 18:
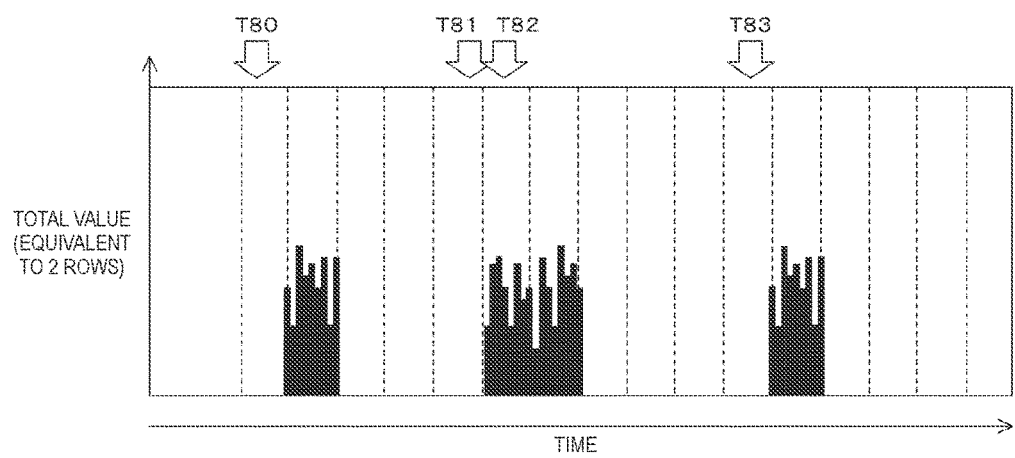
FIG. 18 is a diagram illustrating an example of a radiation counting result according to the fourth embodiment.

FIG. 18 is a diagram illustrating an example of a radiation counting result according to the fourth embodiment. The vertical axis of the drawing represents an output total value from the pixel circuits 220 in one pair of rows and the horizontal axis represents time. Here, the assumed circuit configuration of the light detector 200 is the same as the circuit configuration according to the first embodiment, but the number of control lines 218 between the pixel circuit 220 and the row driving circuit 280 is changed from 3 to 4.

In the fourth embodiment, a plot of the output total value equivalent to two rows is formed in an output shape resembling a pulse with a time width equivalent to one frame and a total sum of output values for each pulse is equivalent to a light emission amount of the scintillator. The maximum difference from the first embodiment is synchronization of a pulse output with a frame output regardless of a light emission timing of the scintillator 120.

Signals of light received in a cyclic global shutter are stored in the photodiodes 221 during a corresponding frame period. The signals are transmitted to the intermediate nodes 236 en bloc at the end of the period and are sequentially output from a starting address during a subsequent frame period.

In the first embodiment, a certain algorithm that determines the shape of an output for which a start timing is unexpected as a significant pulse is necessary. In the fourth embodiment, however, such an algorithm is not necessary. In addition, at timings T81 and T82, light is emitted at proximate timings. However, when light is emitted during mutually different frame periods, the radiation counting device 100 can determine the light emission as different light emission and correctly perform counting. That is, by adopting the global shutter scheme, data processing of an output of the light detector 200 is easy and precise in the radiation counting and an effective count rate is also expected to be improved.

In this way, according to the fourth embodiment, to transmit the charge to the intermediate node 236 at the time of exposure end and transmit the charge from the intermediate node 236 to the detection node 224 at the time of reading, the row driving circuit 280 can expose the pixels in the global shutter scheme.

5. Fifth Embodiment

Incidentally, a plurality of miniature pixel array units may be disposed in a matrix form and a simultaneous operation may be able to be performed. In such a chip, because a pad or a control circuit can be shared to further improve an aperture ratio of the chip, and mounting is easy, the chip can be used for a plurality of uses. The light detector 202 according to the fifth embodiment is different from the light detector according to the first embodiment in that a plurality of pixel array units are disposed in a matrix form and the simultaneous operation can be performed.

Figure 19:
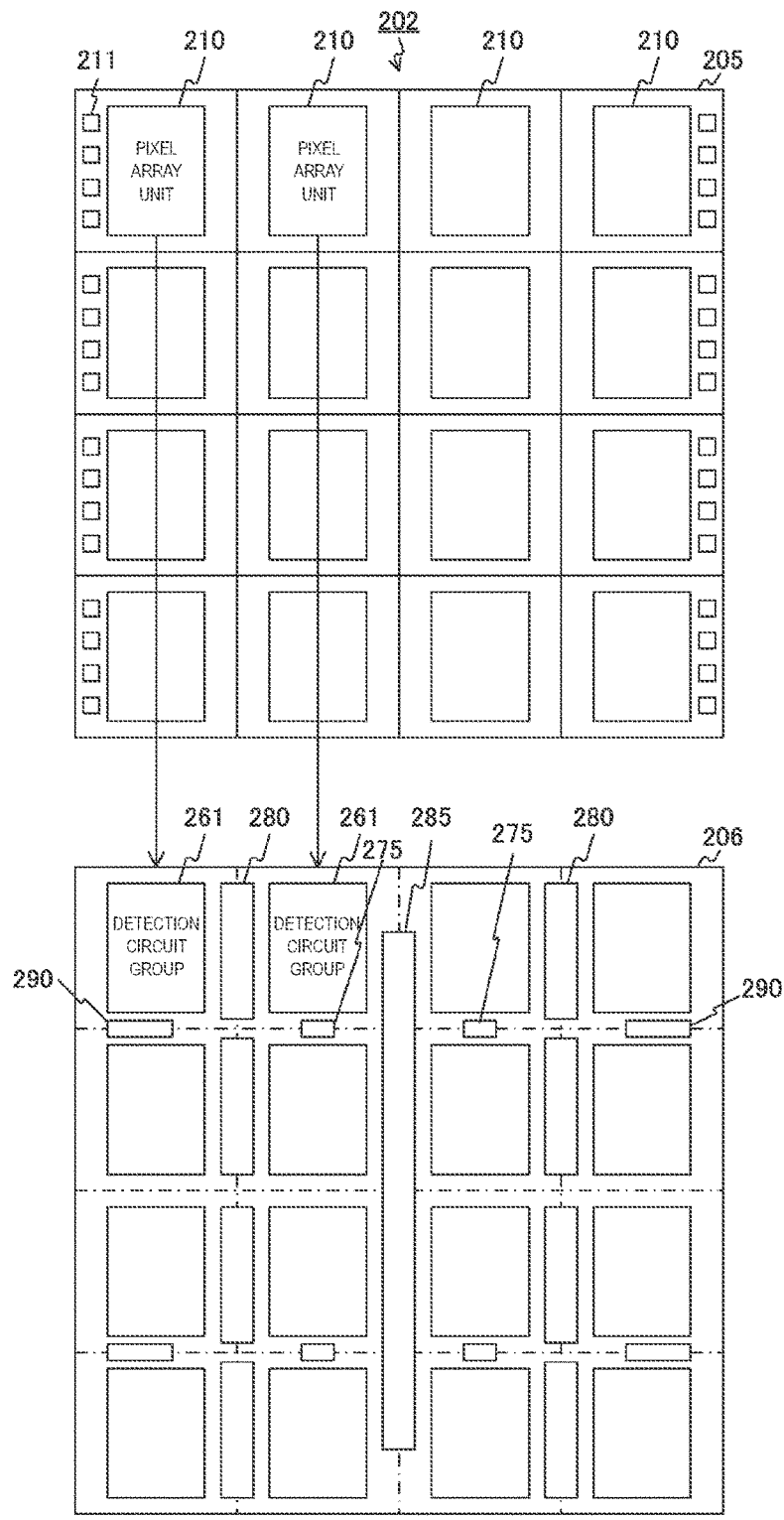
FIG. 19 is a block diagram illustrating a configuration example of a light detector according to a fifth embodiment.

FIG. 19 is a block diagram illustrating a configuration example of the light detector 202 according to the fifth embodiment. The 4×4 pixel array units 210 are disposed uniformly at a pitch of 2.5 mm in a matrix form on a silicon chip (the upper-side substrate 205) of a square of about 1 cm. In each pixel array unit 210, 130×150 pixels of a square of 16 μm are disposed in an array form and the size of the opening portion is 2.08 mm×2.25 mm. That is, an aperture ratio of the entire chip is about 75%. The detection circuit group 261 is disposed in a lower layer of each pixel array unit 210. The detection circuit group 261 includes one detection circuit 240, for example, every 10 pixels, sequentially selects the pixels, and performs reading.

Each pixel array unit 210 corresponds to an independent light detector, but the 4×4 pixel array units 210 perform operations simultaneously and in parallel. Therefore, the timing control circuit 285 at first and various control circuits can be shared by the plurality of light detectors. When a circuit including the pixel array unit 210 and the detection circuit group 261 is set as one light detector 207, the row driving circuit 280 is shared by two light detectors 207 and the reference voltage generation circuit 275 and the output circuit 290 are shared by four light detectors 207 in the embodiment. In addition, one timing control circuit 285 is shared by all the light detectors 207. In addition, bonding pads 211 for timing signals or a power supply can also be shared by the plurality of light detectors 207, and thus the aperture ratio can be improved to that extent and the chip can be easily mounted.

Such a chip can be used alone and the plurality of chips can be spread out to be used in a large-sized detector such as SPECT. Each light detector on the chip corresponds to SPECT, and thus considerably low noise occurs using the pixel with a large area. Accordingly, for example, a scintillator of a square of about 1 cm can be combined with a single chip to be used as a survey meter. In this case, the 4×4 light detectors 207 on the chip are used as the single integrated light detector 202 and a total value of incident light amounts is derived by the data processing unit 140.

6. Sixth Embodiment

From the same idea, the pixel array unit 210 which is a light reception unit can be further miniaturized to also correspond to CT or FPD. The light detector 202 according to the fifth embodiment is different from the light detector according to the fifth embodiment in that the plurality of pixel array units 210 are further miniaturized.

Figure 20:
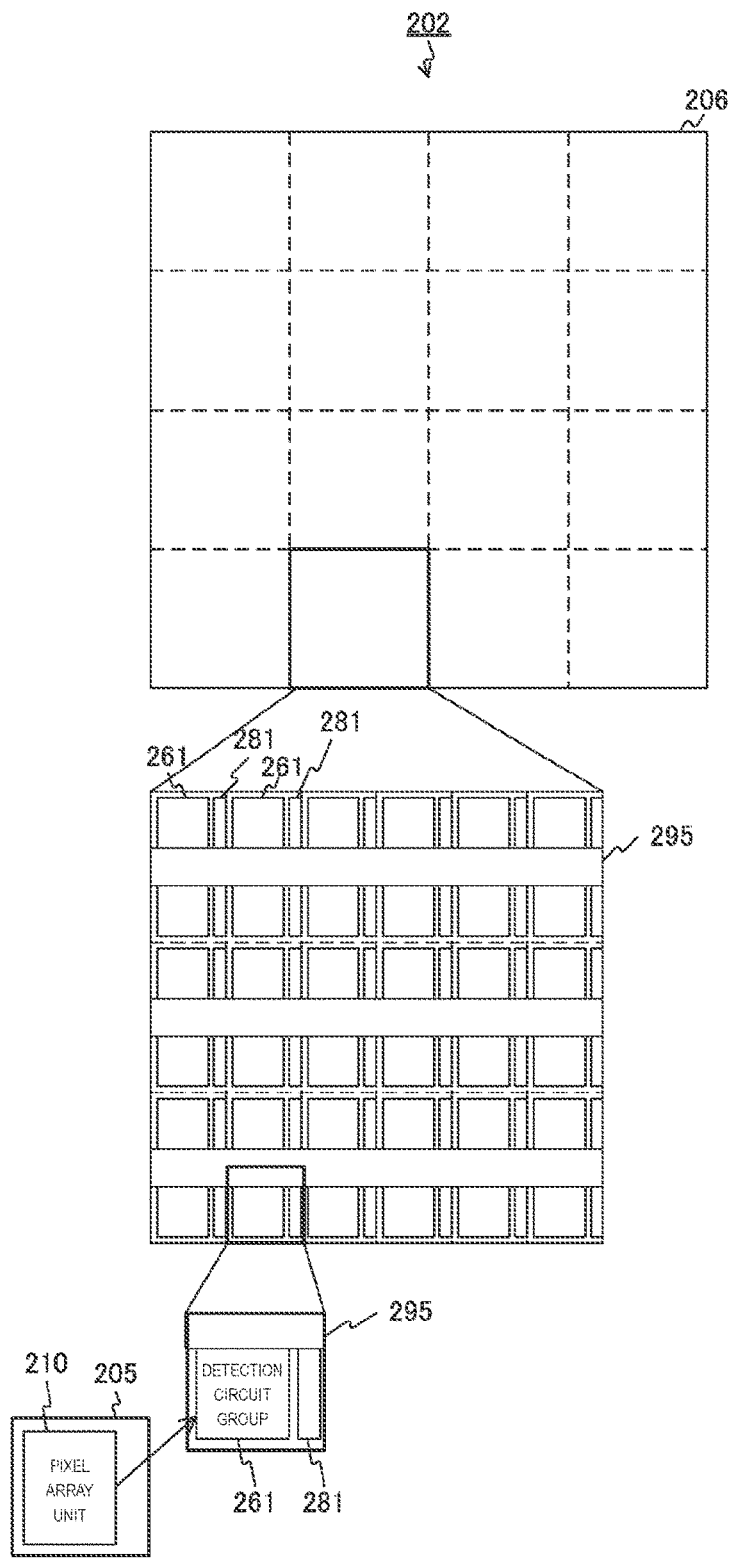
FIG. 20 is a block diagram illustrating a configuration example of a light detector according to a sixth embodiment.

FIG. 20 is a block diagram illustrating a configuration example of the light detector 202 according to the sixth embodiment. In the embodiment, the pixel array units 210 are disposed uniformly in a matrix from at a pitch of 400 μm. When a circuit configured to include the pixel array unit 210 and the detection circuit group 261 is set as one light detector 207, the 24×24 light detectors 207 are disposed in an array form in the entire chip. In the pixel array unit 210, the 24×24 pixel circuits 220 of a square of 16 μm are arrayed in an array form and the size of opening portion is 320 μm×384 μm. In this case, an aperture ratio of the chip is about 77%.

A detection circuit group 216 is disposed to be stacked in a lower layer of each pixel array unit 210. The detection circuit group 261 includes one detection circuit 240, for example, every 10 pixels, sequentially selects the pixels, and performs reading.

The pixel array units 210 respectively correspond to the independent light detectors 207, but perform operations simultaneously and in parallel. Therefore, the timing control circuit 285 at first and various control circuits can be shared by the plurality of light detectors. For example, when the row driving circuit 280 is shared by 6 light detectors 207 that are lined horizontally, the circuit components 281 may be distributed and disposed for each light detector 207. In the drawing, a circuit configured to include 6 circuit components 281 lined in one column operates as one row driving circuit 280. For example, when the row driving circuit 280 which is equivalent to 4 rows of unit pixels is allocated to one light detector 207, the pixel arrays of all the 24 rows can be driven by the 6 light detectors 207. The number of light detectors 207 that share the row driving circuit 280 is not limited to 6, or may be 12 or all the light detectors 207 horizontally arranged on the chip.

Similarly, the timing control circuit 285, the reference voltage generation circuit 275, the output circuit 290, and the like can be shared by the plurality of light detectors and distributed and disposed in an ensured space. For example, the circuit block 295 is disposed for every two lines formed by 6 pixel array units 210 arranged in a predetermined direction and the circuit block 295 is shared by the lines. The circuit block 295 includes the timing control circuit 285, the reference voltage generation circuit 275, and the output circuit 290.

In the embodiment, the light detectors 207 are spread out on the entire surface of the chip at a narrow pitch. Therefore, when the bonding pads are formed in the light reception surface of the upper-side chip, light receivers (pixels) of the bonding pads have to be deleted. In a case of radiation transmission imaging in CT or FPD, the data processing unit 140 may complement the pixel of defective portion from a surrounding pixel at the time of image processing. However, it is preferable to install a through-via in the lower-side chip (206) and install the through-via and form the pad on the rear side of the chip, that is, the opposite surface to the light reception surface.

Figure 21:
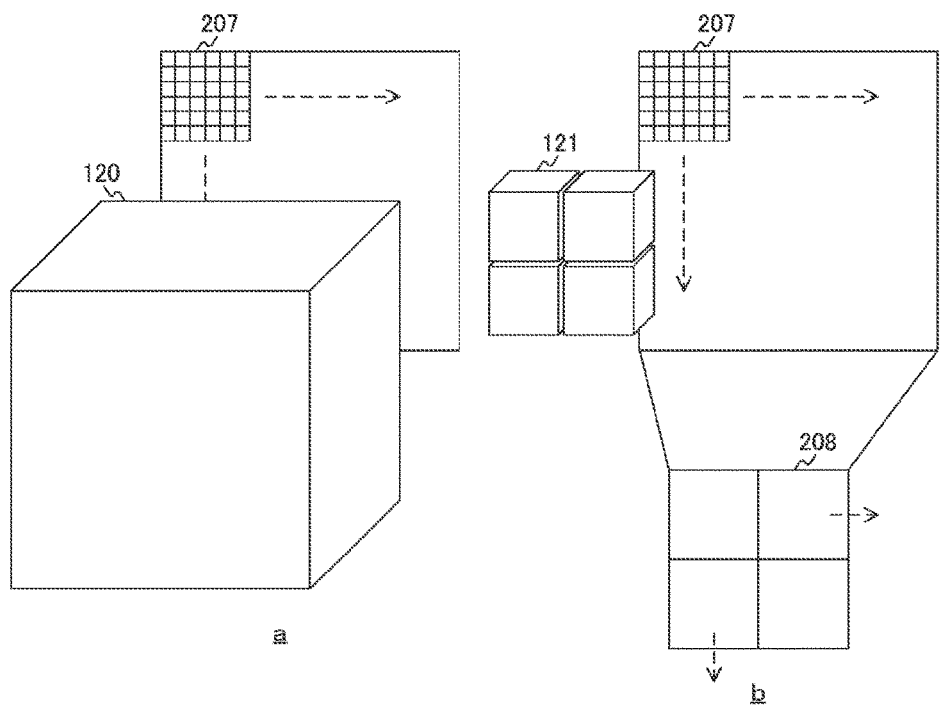
FIG. 21 is a diagram illustrating examples of a survey meter, SPECT, CT, and FPD according to the sixth embodiment.
Figure 21:
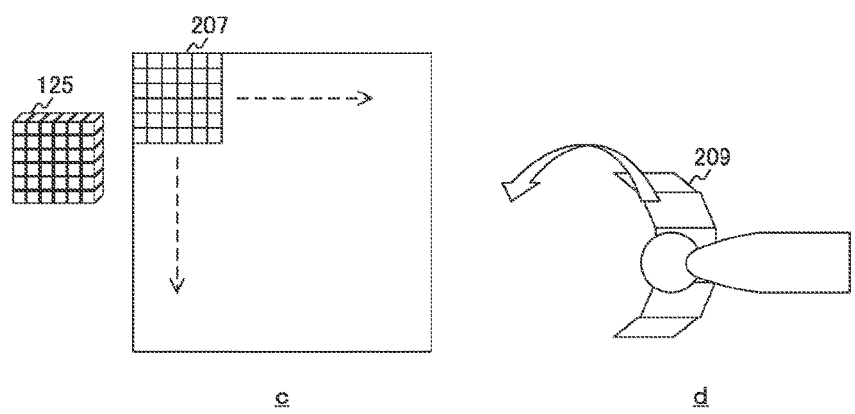

An example in which the chip in FIG. 20 is used in a survey meter, SPECT, CT, and FPD is illustrated in FIG. 21. The 24×24 light detectors 207 are disposed in a matrix form at a pitch of 400 μm in the chip. The size of the chip is about a square of about 9.6 mm.

FIG. 22a is a diagram illustrating an example of a survey meter according to the sixth embodiment. In the survey meter, for example, the single chip and the scintillator 120 of a square of 9.5 mm are combined to perform radiation counting. All the light detectors 207 on the chip are used as one integrated light detector and a total sum of detected light amounts is calculated by the data processing unit 140.

FIG. 22b is a diagram illustrating an example of SPECT or a gamma camera according to the sixth embodiment. In the SPECT or the gamma camera, the 6×6 light detectors 207 are used as an independent light detector group 208, and the scintillators 121 or the like in which a partition wall is installed to correspond to the light detector group are disposed at a pitch of 2.4 mm. A total sum of light amounts is calculated by the data processing unit 140 using the light amount as the group unit. Light reception modules including the chips and the scintillators can be spread out on a planar shape as necessary.

FIG. 22c is a diagram illustrating an example of FPD according to the sixth embodiment. FIG. 22d is a diagram illustrating an example of CT according to the sixth embodiment. In CT or FPD, independent light amount detection is performed for each of the light detector 207 lined at a pitch of 400 μm. The radiation detection modules 209 including the light detectors 207 and the scintillators 125 on the chip are spread out in an arch shape in CT, as exemplified in FIG. 21d, or in a planar shape, as exemplified in FIG. 21c in FPD, as necessary. For CT and FPD, integral type radiation detection is mainstream rather than the current radiation counting, but the present invention can be used for any type. In the radiation detection module according to the present invention, low noise and high sensitivity are realized and a dynamic range of detection is considerably broader than in a photon counting type detector such as SiPM. Accordingly, the radiation detection module can also be used for integral type radiation detection.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

Note that the effects described here are not necessarily limited, and any effect that is desired to be described in the present disclosure may be exhibited.

Additionally, the present technology may also be configured as below.

(1)
A radiation counting device including:
a scintillator configured to generate a photon when a radiation is incident;
a pixel circuit configured to convert the photon into charge, store the charge over a predetermined period, and generate an analog voltage in accordance with amount of the stored charge; and
an analog-to-digital conversion circuit configured to convert the analog voltage into a digital signal in a predetermined quantization unit less than the analog voltage generated from the one photon.

(2)
The radiation counting device according to (1),
wherein the analog-to-digital conversion circuit converts the analog voltage into a digital signal in the quantization unit not exceeding half of the analog voltage generated from the one photon.

(3)
The radiation counting device according to (1),
wherein the analog-to-digital conversion circuit converts the input voltage into a digital signal in the quantization unit not exceeding ¼ of the analog voltage generated from the one photon.

(4)
The radiation counting device according to any of (1) to (3),
wherein the pixel circuit includes
a photoelectric conversion unit configured to convert the photon into charge,
a charge storage unit configured to store the charge and generate a voltage in accordance with—amount of the charge as the analog voltage, and
an amplification element configured to amplify the analog voltage and output the amplified analog voltage to the analog-to-digital conversion circuit.

(5)
The radiation counting device according to any of (1) to (4), including:
a plurality of the scintillators,
wherein a predetermined number of the pixel circuit is installed for each of the scintillators.

(6)
The radiation counting device according to any of (1) to (5),
wherein the pixel circuit is installed in a first substrate, and
the detection circuit is installed in a second substrate stacked on the first substrate.

(7)
The radiation counting device according to any of (1) to (6),
wherein the pixel circuit includes
a photoelectric conversion unit configured to convert the photon into charge,
an intermediate node configured to retain the charge,
a first transmission unit configured to transmit the charge from the photoelectric conversion unit to the intermediate node,
a charge storage unit configured to store the charge and generate a voltage in accordance with amount of the charge as the analog voltage, and
a second transmission unit configured to transmit the retained charge from the intermediate node to the charge storage unit.

(8)
The radiation counting device according to any of (1) to (7), further including:
a data processing unit configured to process the digital signal and count the number of incident radiations.

(9)
The radiation counting device according to (8),
wherein a predetermined number of the pixel circuits is disposed in a 2-dimensional lattice form in a substrate, and
the data processing unit calculates a total sum of values of a constant number of the digital signals as a value of light emission amount of the scintillator.

(10)
A method of controlling a radiation counting device, the method including:
a photon generation procedure of generating a photon when radiation is incident, by a scintillator;
an analog voltage generation procedure of converting the photon into charge, storing the charge over a predetermined period, and generating an analog voltage in accordance with amount of the stored charge, by a pixel circuit; and
an analog-to-digital conversion procedure of converting the analog voltage into a digital signal in a predetermined quantization unit less than the analog voltage generated from the one photon, by an analog-to-digital conversion circuit.

REFERENCE SIGNS LIST 100 radiation counting device
110 light reception unit
120, 121, 122, 123, 124, 125 scintillator
130 partition wall
140 data processing unit
200, 201, 202, 203, 204, 207 light detector
205 upper-side substrate
206 lower-side substrate
208 light detector group
209 radiation detection module
210 pixel array unit
211 bonding pad
220 pixel circuit
221 photodiode
222 storage node
223, 235, 237 transmission transistor
224 detection node 225 reset transistor
226 amplification transistor
227 select transistor
230 constant current circuit
231 MOS transistor
236 intermediate node
240, 260 detection circuit
241 AD conversion circuit
242, 243 capacitor
244 comparator
245 counter
246 division circuit
250, 270 switch
261 detection circuit group
275 reference voltage generation circuit
280 row driving circuit
281 circuit component
285 timing control circuit
290 output circuit
295 circuit block

What is claimed is:

1. A radiation counting device comprising:
at least one scintillator configured to generate a photon when radiation is incident;
at least one pixel circuit configured to convert the photon into charge, store the charge over a predetermined period, generate a first analog voltage in accordance with an amount of the stored charge, and output a second analog voltage based on the first analog voltage; and
an analog-to-digital conversion circuit configured to convert the second analog voltage into a digital signal in a predetermined quantization unit less than the analog voltage generated from the one photon.

2. The radiation counting device according to claim 1, wherein the predetermined quantization unit does not exceed half of the analog voltage generated from the one photon.

3. The radiation counting device according to claim 1, wherein the predeterminded quantization unit does not exceed ¼ of the analog voltage generated from the one photon.

4. The radiation counting device according to claim 1, wherein the pixel circuit includes:
a photoelectric conversion unit configured to convert the photon into the charge;
a charge storage unit configured to store the charge and generate the first analog voltage;
and an amplification element configured to amplify the first analog voltage and outputs the second analog voltage as an amplified analog voltage to the analog-to-digital conversion circuit.

5. The radiation counting device according to claim 1, comprising:
the at least one scintillator includes a plurality of the scintillators; and
the at least one pixel circuit includes a plurality of pixel circuits,
wherein a predetermined number of the pixel circuits are installed for each of the scintillators.

6. The radiation counting device according to claim 1,
wherein the pixel circuit is installed in a first substrate, and
the detection circuit is installed in a second substrate stacked on the first substrate.

7. The radiation counting device according to claim 1,
wherein the pixel circuit includes:
a photoelectric conversion unit configured to convert the photon into the charge;
an intermediate node configured to retain the charge;
a first transmission unit configured to transmit the charge from the photoelectric conversion unit to the intermediate node;
a charge storage unit configured to store the charge and generate the first analog voltage; and
a second transmission unit configured to transmit the retained charge from the intermediate node to the charge storage unit.

8. The radiation counting device according to claim 1, further comprising:
a data processing unit configured to process the digital signal and count the number of incident radiations.

9. The radiation counting device according to claim 8,
wherein the at least one pixel circuit includes a predetermined number of the pixel circuits that are disposed in a 2-dimensional lattice form in a substrate,
wherein the analog-to-digital conversion circuit is configured to generate a plurality of digital signals, and
wherein the data processing unit is configured to calculate a total sum of values of a constant number of the digital signals as a value of a light emission amount of the scintillator.

10. A method of controlling a radiation counting device, the method comprising:
a photon generation procedure of generating a photon when radiation is incident, by a scintillator;
an analog voltage generation procedure of converting the photon into charge, storing the charge over a predetermined period, and generating an analog voltage in accordance with an amount of the stored charge, by a pixel circuit; and
an analog-to-digital conversion procedure of converting the analog voltage into a digital signal in a predetermined quantization unit less than the analog voltage generated from the one photon, by an analog-to-digital conversion circuit.

* * * * *